(12) United States Patent
Shin et al.

(10) Patent No.: US 11,768,559 B2
(45) Date of Patent: Sep. 26, 2023

(54) TOUCH DISPLAY DEVICE AND TOUCH DRIVING CIRCUIT

(71) Applicant: LG Display Co., Ltd., Seoul (KR)

(72) Inventors: SeungRok Shin, Paju-si (KR); Sangkyu Kim, Paju-si (KR); DeukSu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/842,250

(22) Filed: Jun. 16, 2022

(65) Prior Publication Data

US 2023/0004274 A1 Jan. 5, 2023

(30) Foreign Application Priority Data

Jun. 30, 2021 (KR) .......................... 10-2021-0086106

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/04164* (2019.05); *G06F 3/0446* (2019.05)

(58) Field of Classification Search
CPC ............. G06F 3/04166; G06F 3/04164; G06F 3/0412; G06F 3/0446
See application file for complete search history.

(56) References Cited

U.S. PATENT DOCUMENTS

| | | | |
|---|---|---|---|
| 2013/0069894 A1* | 3/2013 | Chen ..................... | G06F 3/0445 345/173 |
| 2018/0004343 A1* | 1/2018 | Shin ..................... | G02F 1/13338 |
| 2019/0302934 A1* | 10/2019 | Rhe ........................ | G06F 3/0443 |

* cited by examiner

*Primary Examiner* — Peter D McLoone
(74) *Attorney, Agent, or Firm* — Fenwick & West LLP

(57) ABSTRACT

A touch display device and a touch driving circuit are configured to drive at least one of the plurality of first touch electrode lines disposed in a first area with a first touch driving signal having a first touch driving frequency, and drive at least one of the plurality of second touch electrode lines disposed in a second area with a second touch driving signal having a second touch driving frequency that is different from the first touch driving frequency. Each of the first touch driving frequency and the second touch driving frequency is different from a display driving frequency related to display driving. to the touch display device reduces the influence of noise, increases the signal-to-noise ratio, and reduces the influence of driving the display, thereby improving the touch sensitivity.

20 Claims, 22 Drawing Sheets

TOUCH DISPLAY DEVICE AND TOUCH DRIVING CIRCUIT

CROSS-REFERENCE TO RELATED APPLICATION

This application claims the benefit and priority from Republic of Korea Patent Application No. 10-2021-0086106, filed in the Republic of Korea on Jun. 30, 2021, which is hereby incorporated by reference in its entirety.

BACKGROUND

Technical Field

Embodiments of the present disclosure relate to a touch display device and a touch driving circuit.

Description of the Related Art

In addition to the function of displaying an image, a touch display device may provide a touch-based input function that allows the user to easily, intuitively, and conveniently input information or commands.

In order to provide the touch-based input function, the touch display device should be able to detect the presence of a user's touch and accurately sense the touch coordinates. To this end, the touch display device may include a touch sensor.

On the other hand, the touch display device may have a problem in that various noise is generated due to various factors during touch sensing or a signal-to-noise ratio is reduced, so that touch sensitivity is reduced.

For example, since the touch display device needs to provide both an image display function and a touch sensing function, display driving may affect touch sensing. Accordingly, during touch sensing, noise may be generated or a signal-to-noise ratio may be reduced by the display driving. Accordingly, touch sensitivity may be reduced.

In addition, when a structural environment in which various noise can be induced in the touch sensor is created in the display panel or the touch display device, a phenomenon in which a signal-to-noise ratio is reduced or a touch sensitivity is deteriorated may be caused by various noises induced in the touch sensor.

In addition, when the touch sensor is of a type that is built into the display panel, when the touch display device is a self-luminous display device such as an organic light emitting display device, or when the display panel has a large area, the above phenomenon, in which noise is generated or the signal-to-noise ratio is reduced, and thus the touch sensitivity is reduced, may be more severe.

SUMMARY

Embodiments of the present disclosure may provide a touch display device and a touch driving circuit that are robust to noise and have a high signal-to-noise ratio.

Embodiments of the present disclosure may provide a touch display device and a touch driving circuit that are robust to noise and have a high signal-to-noise ratio even in a self-luminous display structure (e.g., organic light emitting display structure, etc.).

Embodiments of the present disclosure may provide a touch display device and a touch driving circuit that are robust against noise and have a high signal-to-noise ratio even on a large-area panel.

Embodiments of the present disclosure may provide a touch sensor structure in which the influence of display driving on touch sensing can be reduced, and provide a touch driving circuit and a touch display device suitable for the touch sensor structure.

Embodiments of the present disclosure may provide a touch display device and a touch driving circuit for driving the touch sensors grouped in units of two or more areas with touch driving signals having different touch driving frequencies.

Embodiments of the present disclosure may provide a touch display device and a touch driving circuit for driving a touch sensor with a touch driving signal having a touch driving frequency that avoids a display driving frequency related to display driving.

In one embodiment, a touch display device comprises: a touch sensor including a plurality of first touch electrode lines and a plurality of second touch electrode lines; and a touch driving circuit configured to drive at least one of the plurality of first touch electrode lines with a first touch driving signal having a first touch driving frequency, and drive at least one of the plurality of second touch electrode lines with a second touch driving signal having a second touch driving frequency that is different from the first touch driving frequency, wherein each of the first touch driving frequency and the second touch driving frequency is different from a display driving frequency related to display driving to display an image on the touch display device.

In one embodiment, a touch display device comprises: a first driving touch electrode included in a display panel of the touch display device, the first touch electrode applied with a first driving signal having a first frequency during a first driving period; a second driving touch electrode included in the display panel, the second driving touch electrode applied with a second driving signal having a second frequency that is different from the first frequency during the first driving period; a sensing touch electrode crossing the first driving touch electrode and the second driving touch electrode; and a touch driving circuit including a filter, the touch driving circuit configured to detect a signal from the sensing touch electrode during the first driving period and the filter outputs a first sensing signal having the first frequency and a second sensing signal having the second frequency based on the detected signal from the sensing touch electrode.

In one embodiment, a touch ouch driving circuit comprising: a first transmitting circuit configured to supply a first touch driving signal having a first touch driving frequency to a first touch electrode line among a plurality of first touch electrode lines disposed in a display panel; and a second transmitting circuit configured to supply a second touch driving signal having a second touch driving frequency to a second touch electrode line among a plurality of second touch electrode lines disposed in the display panel, the second touch driving frequency different from the first touch driving frequency, and wherein each of the first touch driving frequency and the second touch driving frequency is different from a display driving frequency related to display driving to display an image on the display panel.

In one embodiment, a touch display device comprises: a display panel including a first touch electrode line, a second touch electrode line, a signal line to which a display signal is applied to display an image on the display panel, and a light emitting device comprising a first electrode and a second electrode, the first electrode is applied the display signal and the second electrode is overlapped by the signal line; and a touch driving circuit configured to drive the first touch electrode line with a first touch driving signal having a first touch driving frequency, and drive the second touch electrode line with a second touch driving signal having a second touch driving frequency that is different from the first touch driving frequency.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
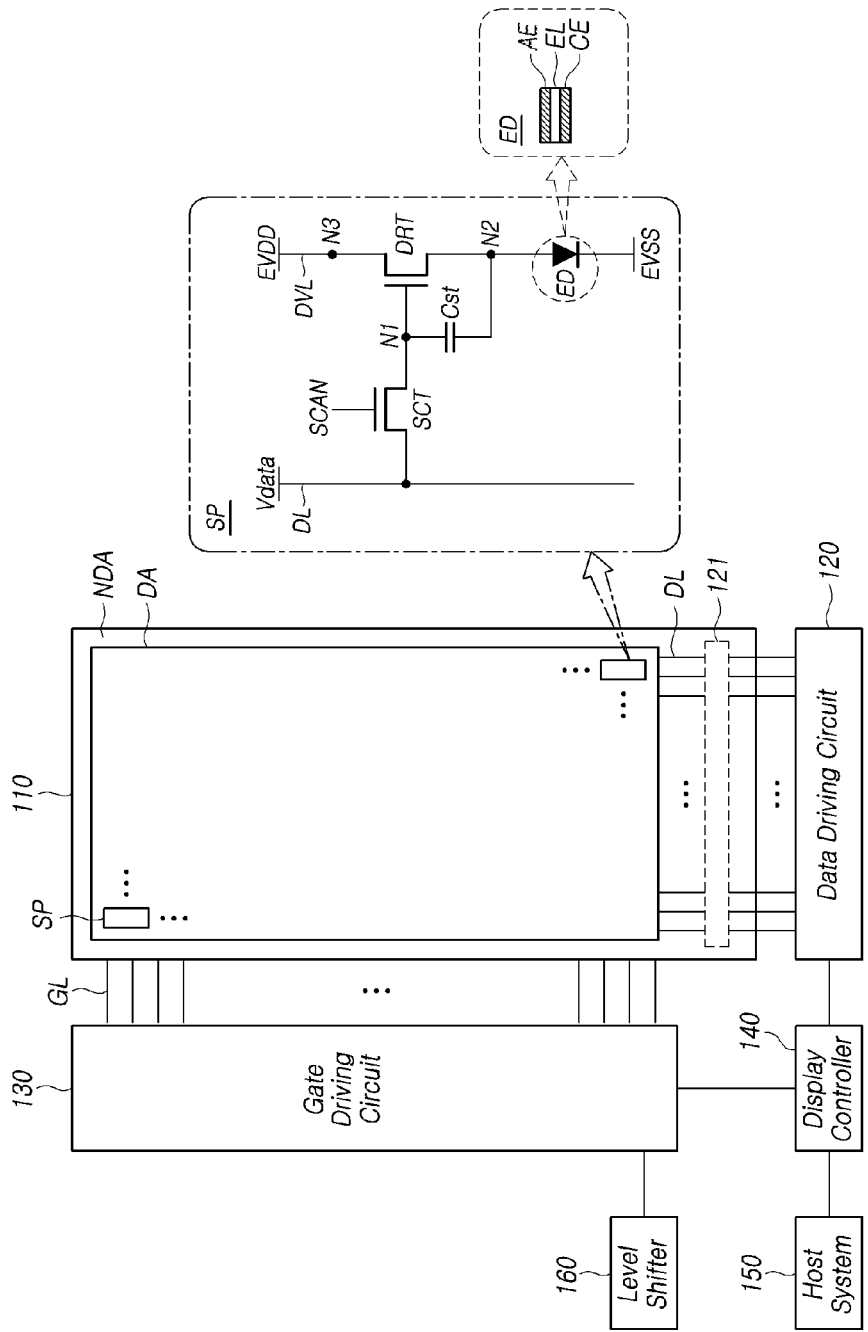
FIG. 1 is a diagram illustrating a display driving system of a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings.

FIG. 1 is a diagram illustrating a display driving system of a touch display device according to embodiments of the present disclosure.

Referring to FIG. 1, the display driving system of a touch display device according to embodiments of the present disclosure may include a display panel 110 and a display driving circuit configured to drive the display panel 110.

The display panel 110 may include a display area DA in which an image is displayed and a non-display area NDA in which an image is not displayed.

The display panel 110 may include a plurality of sub-pixels SP for image display. For example, the plurality of sub-pixels SP may be disposed in the display area DA. In some cases, at least one sub-pixel SP may be disposed in the non-display area NDA. At least one sub-pixel SP disposed in the non-display area NDA is also referred to as a dummy sub-pixel.

The display panel 110 may include a plurality of signal lines for driving the plurality of sub-pixels SP. For example, the plurality of signal lines may include a plurality of data lines DL and a plurality of gate lines GL. The signal lines may further include other signal lines according to the structure of the sub-pixel SP. For example, the other signal lines may include driving voltage lines DVL and the like.

The plurality of data lines DL and the plurality of gate lines GL may cross each other. Each of the plurality of data lines DL may be disposed to extend in the first direction. Each of the plurality of gate lines GL may be disposed to extend in the second direction. Here, the first direction may be a column direction and the second direction may be a row direction. In this specification, a column direction and a row direction are relative. For example, the column direction may be a vertical direction and the row direction may be a horizontal direction. As another example, the column direction may be a horizontal direction and the row direction may be a vertical direction.

The display driving circuit may include a data driving circuit 120 for driving the plurality of data lines DL and a gate driving circuit 130 for driving the plurality of gate lines GL. The display driving circuit may further include a display controller 140 for controlling the data driving circuit 120 and the gate driving circuit 130.

The data driving circuit 120 is a circuit for driving the plurality of data lines DL, and may output data voltages (also called data signals) corresponding to the image signal to the plurality of data lines DL.

The gate driving circuit 130 is a circuit for driving the plurality of gate lines GL, and may generate gate signals and output the gate signals (also called scan signals) to the plurality of gate lines GL.

The display driving circuit may further include a level shifter 160 for supplying gate clock signals to the gate driving circuit 130. The gate driving circuit 130 may generate gate signals based on the gate clock signals received from the level shifter 160, and output the generated gate signals to the gate lines GL according to a predetermined gate driving timing. The level shifter 160 may exist outside the gate driving circuit 130 or may be included in the gate driving circuit 130. The level shifter 160 may also be referred to as a clock generation circuit or a clock supply circuit.

The display controller 140 may control a scanning operation according to timing implemented in each frame, and may control a data driving operation according to the scanning timing. The display controller 140 may convert input image data input from the outside (e.g., host system 150) according to a data signal format used by the data driving circuit 120, and supply the converted image data to the data driving circuit 120.

The display controller 140 may receive display driving control signals from the external host system 150 together with input image data. For example, the display driving control signals may include a vertical synchronization signal (VSYNC), a horizontal synchronization signal (HSYNC), an input data enable signal (DE), a clock signal, and the like.

The display controller 140 may generate data driving control signals and gate driving control signals based on the display driving control signals (e.g., VSYNC, HSYNC, DE, clock signal, etc.) input from the host system 150. Here, the data driving control signals and the gate driving control signals may be control signals included in the display driving control signals.

The display controller 140 may control a driving operation and a driving timing of the data driving circuit 120 by supplying data driving control signals to the data driving circuit 120. For example, the data driving control signals may include a source start pulse (SSP), a source sampling clock (SSC), a source output enable signal (SOE), and the like.

The display controller 140 may control the driving operation and driving timing of the gate driving circuit 130 by supplying gate driving control signals to the gate driving circuit 130. For example, the gate driving control signals may include a gate start pulse (GSP), a gate shift clock (GSC), a gate output enable signal (GOE), and the like.

The data driving circuit 120 may include one or more source driver integrated circuits (SDIC). Each SDIC may include a shift register, a latch circuit, a digital to analog converter (DAC), an output buffer, and the like. Each SDIC may further include an analog-to-digital converter (ADC) in some cases.

For example, the data driving circuit 120 may be connected to the display panel 110 in a tape automated bonding (TAB) method, a chip-on-glass (COG) method, or a chip-on-panel (COP) method. Alternatively, the data driving circuit 120 may be implemented in a chip-on-film (COF) method and connected to the display panel 110.

The gate driving circuit 130 may output a gate signal of a turn-on level voltage or a gate signal of a turn-off level voltage according to the control of the display controller 140. The gate driving circuit 130 may sequentially drive the plurality of gate lines GL by sequentially supplying a gate signal having a turn-on level voltage to the plurality of gate lines GL.

The gate driving circuit 130 may be connected to the display panel 110 by a tape automated bonding (TAB) method, a chip-on-glass (COG) method, or a chip-on-film (COF) method. Alternatively, the gate driving circuit 130 may be formed in the non-display area NDA of the display panel 110 in a gate in panel (GIP) type. The gate driving circuit 130 may be disposed on or connected to the substrate. That is, in the case of the GIP type, the gate driving circuit 130 may be disposed in the non-display area NDA of the substrate. The gate driving circuit 130 may be connected to the substrate in the case of a chip-on-glass (COG) type, a chip-on-film (COF) type, or the like.

The data driving circuit 120 and the gate driving circuit 130 may be disposed in the non-display area NDA or may be connected to the non-display area NDA. Alternatively, at least one of the data driving circuit 120 and the gate driving circuit 130 may be disposed in the display area DA. For example, at least one of the data driving circuit 120 and the gate driving circuit 130 may be disposed to partially or entirely overlap the sub-pixels SP.

The data driving circuit 120 may supply the analog data voltage Vdata to the plurality of data lines DL when a specific gate line GL is driven by the gate driving circuit 130. The data driving circuit 120 may convert the image data received from the display controller 140 into an analog data voltage Vdata before supplying the data voltage Vdata.

The data driving circuit 120 may be connected to one side (e.g., top or bottom) of the display panel 110. Depending on the driving method, the panel design method, etc., the data driving circuit 120 may be connected to both sides (e.g., top and bottom) of the display panel 110, or may be connected to two or more of the four sides of the display panel 110.

The gate driving circuit 130 may be connected to one side (e.g., left or right) of the display panel 110. Depending on the driving method, the panel design method, etc., the gate driving circuit 130 may be connected to both sides (e.g., left and right) of the display panel 110, or may be connected to two or more of the four sides of the display panel 110.

The display controller 140 may be implemented as a separate component from the data driving circuit 120. Alternatively, the display controller 140 may be integrated with the data driving circuit 120 to be implemented as an integrated circuit.

The display controller 140 may be a timing controller used in a conventional display technology, or a control device capable of further performing other control functions and including a timing controller. The display controller 140 may be implemented with various circuits or electronic components such as an integrated circuit (IC), a field programmable gate array (FPGA), an application specific integrated circuit (ASIC), or a processor.

The display controller 140 may be mounted on a printed circuit board or a flexible printed circuit, and may be electrically connected to the data driving circuit 120 and the gate driving circuit 130 through a printed circuit board or a flexible printed circuit.

The display controller 140 may transmit and receive signals to and from the data driving circuit 120 according to one or more predetermined interfaces. Here, for example, the interfaces may include at least one of a low voltage differential signaling (LVDS) interface, an embedded clock point-to-point Interface (EPI), and a serial peripheral interface (SPI).

The display controller 140 may include a storage medium such as one or more registers.

The touch display device according to the embodiments of the present disclosure may be a self-luminous display device in which the display panel 110 emits light by itself. When the touch display device according to embodiments of the present disclosure is a self-luminous display device, each of the plurality of sub-pixels SP may include a light emitting device ED.

For example, the touch display device according to the embodiments of the present disclosure may be an organic light emitting display device in which the light emitting device ED is implemented as an organic light emitting diode (OLED). For another example, the touch display device according to the embodiments of the present disclosure may be an inorganic light emitting display device in which the light emitting device ED is implemented as an inorganic material-based light emitting diode. For another example, the touch display device according to the embodiments of the present disclosure may be a quantum dot display device in which the light emitting device ED is implemented with quantum dots, which are semiconductor crystals that emit light.

Referring to FIG. 1, in the touch display device according to the embodiments of the present disclosure, each sub-pixel SP may include a light emitting device ED, a driving transistor DRT for controlling the current flowing to the light emitting device ED, a scan transistor SCT for transferring the data voltage Vdata corresponding to the image signal to the driving transistor DRT, and a storage capacitor Cst for maintaining a constant voltage for a period of time.

The light emitting device ED may include an anode electrode AE (e.g., a pixel electrode) and a cathode electrode CE, and a light emitting layer EL positioned between the anode electrode AE and the cathode electrode CE. For example, the light emitting device ED may be one of an organic light emitting diode (OLED), an inorganic light emitting diode, a quantum dot light emitting device, and the like.

The cathode electrode CE of the light emitting device ED may be a common electrode. In this case, the base voltage EVSS may be applied to the cathode electrode CE of the light emitting device ED. For example, the base voltage EVSS may be a ground voltage or a voltage similar to the ground voltage.

The driving transistor DRT is a transistor for driving the light emitting device ED, and may include a first node N1, a second node N2, a third node N3, and the like.

The first node N1 of the driving transistor DRT may be a gate node, and may be electrically connected to a source node or a drain node of the scan transistor SCT.

The second node N2 of the driving transistor DRT may be a source node or a drain node, and may be electrically connected to the pixel electrode PE of the light emitting device ED.

The third node N3 of the driving transistor DRT may be a drain node or a source node, and a driving voltage EVDD may be applied thereto. The third node N3 of the driving transistor DRT may be electrically connected to the driving voltage line DVL supplying the driving voltage EVDD.

The scan transistor SCT may control the connection between the first node N1 of the driving transistor DRT and the corresponding data line DL according to the scan signal SCAN supplied from the gate line GL.

A drain node or a source node of the scan transistor SCT may be electrically connected to a corresponding data line DL. A source node or a drain node of the scan transistor SCT may be electrically connected to the first node N1 of the driving transistor DRT. A gate node of the scan transistor SCT may be electrically connected to the gate line GL to receive the scan signal SCAN.

The scan transistor SCT may be turned on by the scan signal SCAN having a turn-on level voltage to transfer the data voltage Vdata supplied from the corresponding data line DL to the first node N1 of the driving transistor DRT.

The scan transistor SCT may be turned on by the scan signal SCAN having a turn-on level voltage, and may be turned off by the scan signal SCAN having a turn-off level voltage.

When the scan transistor SCT is an n-type transistor, the turn-on level voltage may be a high level voltage, and the turn-off level voltage may be a low level voltage. When the scan transistor SCT is a p-type transistor, the turn-on level voltage may be a low level voltage and the turn-off level voltage may be a high level voltage.

The storage capacitor Cst may be electrically connected between the first node N1 of the driving transistor DRT and the second node N2 of the driving transistor DRT to maintain the data voltage Vdata corresponding to the image signal voltage or a voltage corresponding thereto for one frame time.

The storage capacitor Cst may not be a parasitic capacitor that is an internal capacitor (e.g., Cgs, Cgd), but may be an external capacitor intentionally designed outside the driving transistor DRT.

For example, each of the driving transistor DRT and the scan transistor SCT may be an n-type transistor or a p-type transistor. Both the driving transistor DRT and the scan transistor SCT may be n-type transistors or p-type transistors. At least one of the driving transistor DRT and the scan transistor SCT may be an n-type transistor (or a p-type transistor), and the other may be a p-type transistor (or an n-type transistor).

The structure of each sub-pixel SP illustrated in FIG. 1 is merely an example for description, and each sub-pixel SP may include one or more transistors or may further include one or more capacitors. Meanwhile, all of the plurality of sub-pixels SP may have the same structure. Alternatively, some sub-pixels SP among the plurality of sub-pixels SP may have a different structure from other sub-pixels SP.

Figure 2:
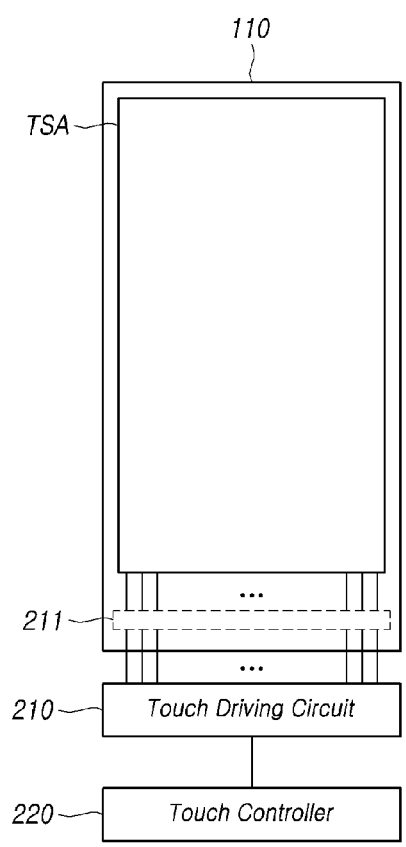
FIG. 2 is a diagram illustrating a touch sensing system of the touch display device according to embodiments of the present disclosure.

FIG. 2 is a diagram illustrating a touch sensing system of the touch display device according to embodiments of the present disclosure.

Referring to FIG. 2, the touch display device according to embodiments of the present disclosure may provide a touch sensing function as well as an image display function. In order to provide a touch sensing function, the touch display device according to the embodiments of the present disclosure may include a touch sensing system that senses a touch generation by a touch pointer or senses a touch position by the touch pointer.

For example, the touch pointer is a user's touch tool, and may include a finger or a pen. When the touch pointer touches the display panel 110, it may mean that the touch pointer touches the display panel 110 in a contact manner or a non-contact manner (also called hover mode). That is, the touch sensing system may sense the touch when the touch pointer is in contact with the display panel 110. Additionally, the touch sensing system may sense a touch even when the touch pointer approaches the display panel 110 without contacting the display panel 110.

The touch sensing system may include a touch sensor disposed in the touch sensing area TSA, and a touch circuit that drives and senses the touch sensor to determine the presence or absence of a touch and/or a touch position.

The touch circuit may include a touch driving circuit 210 configured to drive and sense the touch sensor to output touch sensing data, and a touch controller 220 configured to recognize a touch event or obtain a touch position using the touch sensing data.

The touch sensor may be included in the inside of the display panel 110 or may exist outside the display panel 110.

When the touch sensor is included in the display panel 110, the touch sensor may be formed during the manufacturing process of the display panel 110. When the touch sensor is included in the display panel 110, the touch sensor may be referred to as a built-in touch sensor. For example, the built-in touch sensor may include an in-cell type touch sensor or an on-cell type touch sensor.

When the touch sensor is present outside the display panel 110, the display panel 110 and the touch panel including the touch sensor may be separately manufactured, and the touch panel and the display panel 110 may be bonded. When the touch sensor is present outside the display panel 110, the touch sensor may be referred to as an external touch sensor. For example, the external touch sensor may include an add-on type touch sensor or the like.

Hereinafter, for convenience of description, it is assumed that the touch sensor is included in the display panel 110. However, it is not limited thereto.

The touch sensor may be disposed in the touch sensing area TSA. The location and/or size of the touch sensing area TSA may correspond to the location and/or size of the display area DA. In some cases, the location and/or size of the touch sensing area TSA may be different from the location and/or size of the display area DA.

The touch sensor may include a plurality of touch electrodes and a plurality of touch routing wires. An electrical state (e.g., capacitance, etc.) of at least one of the plurality of touch electrodes may change according to whether the user touches the touch electrode. The plurality of touch routing wires may electrically connect the plurality of touch electrodes to the touch driving circuit 210. The touch driving circuit 210 may sense a change in an electrical state of a corresponding touch electrode through at least one of the plurality of touch routing wires.

When the display panel 110 includes a touch sensor therein, the display panel 110 may include a touch pad unit 211 disposed in the non-display area NDA. The touch pad unit 211 may include a plurality of pads. The plurality of pads may electrically connect the plurality of touch routing wires and the touch driving circuit 210 to each other.

The touch pad unit 211 may be disposed on the substrate of the display panel 110 and disposed in the non-display area NDA, which is an outer area of the display area DA.

The touch driving circuit 210 may generate touch sensing data by driving and sensing the touch sensor. The touch driving circuit 210 may supply the generated touch sensing data to the touch controller 220.

The touch controller 220 may sense touch generation or sense a touch position based on touch sensing data. The touch controller 220 or another controller interworking therewith may perform a predetermined function (e.g., input processing, object selection processing, handwriting processing, etc.) based on the sensed touch generation or the determined touch location.

The touch driving circuit 210 may be implemented as an integrated circuit separate from the data driving circuit 120. Alternatively, the touch driving circuit 210 and the data driving circuit 120 may be integrated into one component and implemented as an integrated circuit.

The touch controller 220 may be implemented separately from the display controller 140. Alternatively, the touch controller 220 may be implemented by being integrated with the display controller 140.

The touch sensing system of the touch display device according to embodiments of the present disclosure may sense a touch based on self-capacitance or may sense a touch based on a mutual-capacitance.

Hereinafter, for convenience of description, it is assumed that the touch sensing system of the touch display device according to embodiments of the present disclosure senses a touch based on a mutual-capacitance.

Hereinafter, examples of a touch sensor structure in the touch display device according to embodiments of the present disclosure will be described with reference to FIGS. 3 and 4.

Figure 3:
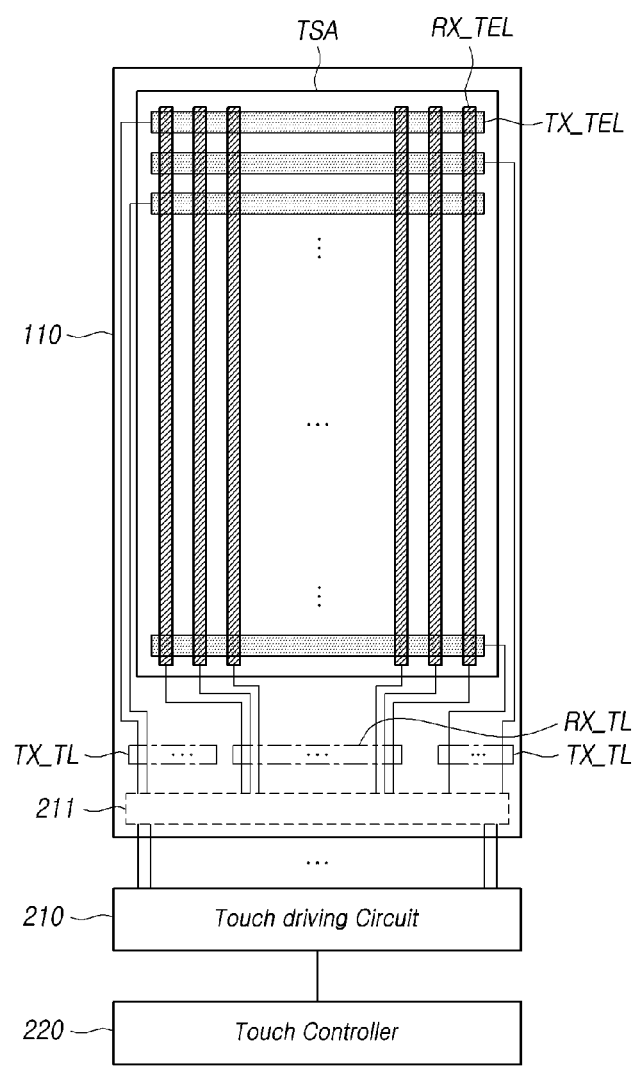
FIG. 3 illustrates a touch sensor structure of the touch display device according to embodiments of the present disclosure.

FIG. 3 illustrates a touch sensor structure of the touch display device according to embodiments of the present disclosure. The touch sensor structure of the touch display device according to the embodiments of the present disclosure shown in FIG. 3 may be a generalized touch sensor structure for sensing a touch based on mutual-capacitance.

Referring to FIG. 3, the touch sensor structure of the touch display device according to embodiments of the present disclosure may include a plurality of touch electrode lines TX_TEL and RX_TEL. However, in the present specification, each of the plurality of touch electrode lines TX_TEL and RX_TEL may also be referred to as touch electrodes.

For mutual-capacitance-based touch sensing, the plurality of touch electrode lines TX_TEL and RX_TEL may include a plurality of transmitting touch electrode lines TX_TEL and a plurality of receiving touch electrode lines RX_TEL.

The plurality of transmitting touch electrode lines TX_TEL and the plurality of receiving touch electrode lines RX_TEL may cross each other. Accordingly, a mutual-capacitance may be formed at points where the plurality of transmitting touch electrode lines TX_TEL and the plurality of receiving touch electrode lines RX_TEL intersect. Here, points where the plurality of transmitting touch electrode lines TX_TEL and the plurality of receiving touch electrode lines RX_TEL intersect may be referred to as touch nodes.

In other words, each of the plurality of receiving touch electrode lines RX_TEL may form mutual-capacitances with the plurality of transmitting touch electrode lines TX_TEL, respectively. At least one of the mutual-capacitances may be changed according to the presence or absence of a touch at the corresponding position.

Referring to FIG. 3, the touch sensor structure of the touch display device according to embodiments of the present disclosure may include a plurality of touch routing wires TX_TL and RX_TL.

The plurality of touch routing wires TX_TL and RX_TL may include a plurality of transmitting touch routing wires TX_TL and a plurality of receiving touch routing wires RX_TL. The plurality of transmitting touch routing wires TX_TL may electrically connect the plurality of transmitting touch electrode lines TX_TEL to the touch pad unit 211. The plurality of receiving touch routing wires RX_TL may electrically connect the plurality of receiving touch electrode lines RX_TEL to the touch pad unit 211.

The plurality of transmitting touch routing wires TX_TL may be electrically connected to the touch driving circuit 210 electrically connected to the touch pad unit 211 through the touch pad unit 211. Accordingly, the plurality of transmitting touch routing wires TX_TL may electrically connect the plurality of transmitting touch electrode lines TX_TEL to the touch driving circuit 210.

The plurality of receiving touch routing wires RX_TL may be electrically connected to the touch driving circuit 210 electrically connected to the touch pad unit 211 through the touch pad unit 211. Accordingly, the plurality of receiving touch routing wires RX_TL may electrically connect the plurality of receiving touch electrode lines RX_TEL to the touch driving circuit 210.

The touch driving circuit 210 may supply a touch driving signal to at least one of the plurality of transmitting touch electrode lines TX_TEL and may sense at least one of the plurality of receiving touch electrode lines RX_TEL.

The transmitting touch electrode line TX_TEL may be referred to as a driving touch electrode line, and the receiving touch electrode line RX_TEL may also be referred to as a sensing touch electrode line.

As shown in FIG. 3, each of the plurality of transmitting touch electrode lines TX_TEL may be disposed while extending in the row direction, and each of the plurality of receiving touch electrode lines RX_TEL may be disposed while extending in the column direction. For example, the row direction may be an X-axis direction or a horizontal direction, and the column direction may be a Y-axis direction or a vertical direction.

Conversely, each of the plurality of transmitting touch electrode lines TX_TEL may be disposed while extending in the column direction, and each of the plurality of receiving touch electrode lines RX_TEL may be disposed while extending in the row direction. For example, the column direction may be a Y-axis direction or a vertical direction, and the row direction may be an X-axis direction or a horizontal direction.

Below, for convenience of explanation, as shown in FIG. 3, it is assumed that each of the plurality of transmitting touch electrode lines TX_TEL is disposed while extending in the row direction, and it is assumed that each of the plurality of receiving touch electrode lines RX_TEL is disposed while extending in the column direction. However, it is not limited thereto.

As shown in FIG. 3, each of the plurality of transmitting touch electrode lines TX_TEL may be one electrode in the form of a bar, and each of the plurality of receiving touch electrode lines RX_TEL may be one electrode in the form of a bar.

Alternatively, at least one of the transmitting touch electrode line TX_TEL and the receiving touch electrode line RX_TEL may include a plurality of touch electrodes electrically connected by bridge electrodes.

For example, one transmitting touch electrode line TX_TEL may be composed of a plurality of transmitting touch electrodes electrically connected by at least one transmitting bridge electrode. That is, one transmitting touch electrode line TX_TEL may include a plurality of transmitting touch electrodes and at least one transmitting bridge electrode electrically connecting the plurality of transmitting touch electrodes. Furthermore, one receiving touch electrode line RX_TEL may be one receiving touch electrode in a bar shape.

The plurality of transmitting touch electrodes and the receiving touch electrode may be located on the same layer as each other. The at least one transmitting bridge electrode may be located on the same layer as the plurality of transmitting touch electrodes and the receiving touch electrode. Alternatively, the at least one transmitting bridge electrode may be located on a different layer than the plurality of transmitting touch electrodes and the receiving touch electrode.

As another example, one transmitting touch electrode line TX_TEL may be one transmitting touch electrode in a bar shape. Furthermore, one receiving touch electrode line RX_TEL may be composed of a plurality of receiving touch electrodes electrically connected by at least one receiving bridge electrode. That is, one receiving touch electrode line RX_TEL may include a plurality of receiving touch electrodes and at least one receiving bridge electrode electrically connecting the plurality of receiving touch electrodes.

The plurality of receiving touch electrodes and the transmitting touch electrode may be located on the same layer as each other. The at least one receiving bridge electrode may be located on the same layer as the plurality of receiving touch electrodes and the transmitting touch electrode. Alternatively, the at least one receiving bridge electrode may be located on a different layer than the plurality of receiving touch electrodes and the transmitting touch electrode.

As another example, one transmitting touch electrode line TX_TEL may be configured of a plurality of transmitting touch electrodes electrically connected by at least one transmitting bridge electrode. Furthermore, one receiving touch electrode line RX_TEL may be composed of a plurality of receiving touch electrodes electrically connected by at least one receiving bridge electrode.

The plurality of transmitting touch electrodes and receiving touch electrodes may be located on the same layer as each other. At least one of the transmitting bridge electrode and the receiving bridge electrode may be located on a different layer from the plurality of transmitting touch electrodes and the receiving touch electrodes.

Figure 4:
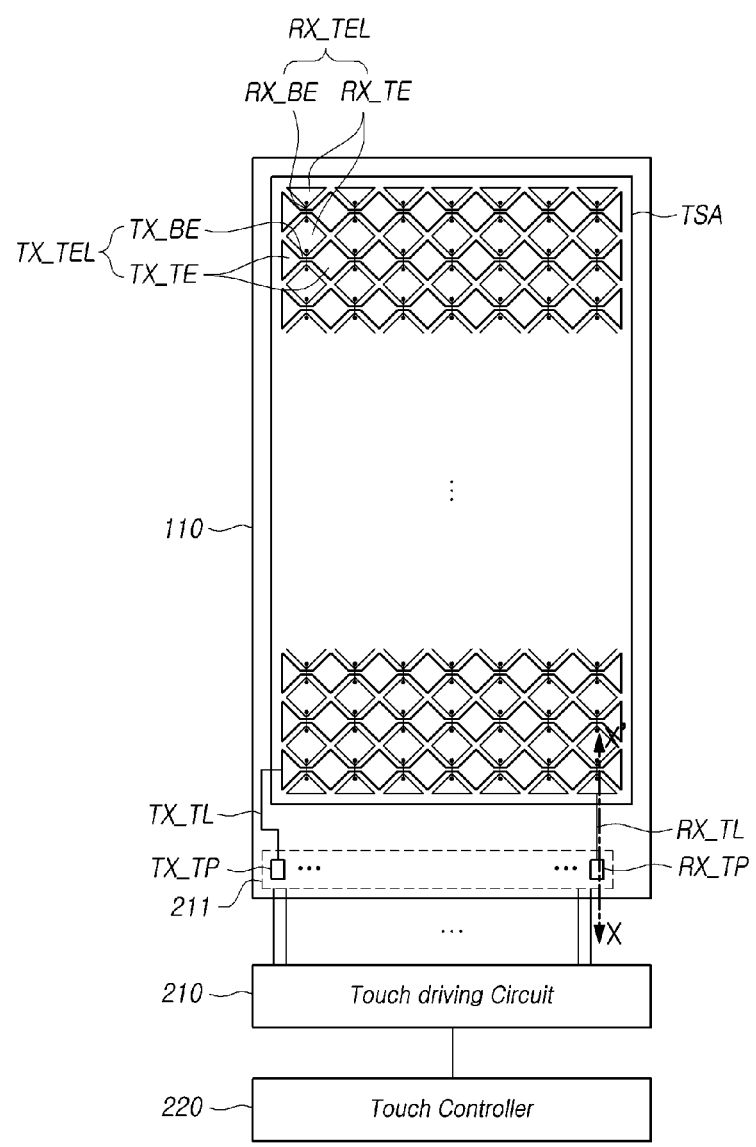
FIG. 4 illustrates another touch sensor structure of the touch display device according to embodiments of the present disclosure.

FIG. 4 illustrates another touch sensor structure of the touch display device according to embodiments of the present disclosure.

FIG. 4 is a structure of a touch sensor different from that of FIG. 3. However, if the touch sensor structure of FIG. 4 is equivalently represented, the touch sensor structure of FIG. 4 may be substantially the same as the touch sensor structure of FIG. 3.

Referring to FIG. 4, each of the plurality of transmitting touch electrode lines TX_TEL disposed in the touch sensing area TSA may include a plurality of transmitting touch electrodes TX_TE and at least one transmitting bridge electrode TX_BE electrically connecting the plurality of transmitting touch electrodes TX_TE.

The at least one transmitting bridge electrode TX_BE may be located on the same layer as the plurality of transmitting touch electrodes TX_TE, or may be located on a different layer from the plurality of transmitting touch electrodes TX_TE.

When the at least one transmitting bridge electrode TX_BE is located on the same layer as the plurality of transmitting touch electrodes TX_TE, the at least one transmitting bridge electrode TX_BE and the plurality of transmitting touch electrodes TX_TE may be integrally formed.

Each of the plurality of receiving touch electrode lines RX_TEL disposed in the touch sensing area TSA may include a plurality of receiving touch electrodes RX_TE and at least one receiving bridge electrode RX_BE electrically connecting the plurality of receiving touch electrodes RX_TE.

The at least one receiving bridge electrode RX_BE may be located on a different layer from the plurality of receiving touch electrodes RX_TE, or may be located on the same layer as the plurality of receiving touch electrodes RX_TE.

When the at least one receiving bridge electrode RX_BE is located on the same layer as the plurality of receiving touch electrodes RX_TE, the at least one receiving bridge electrode RX_BE and the plurality of receiving touch electrodes RX_TE may be integrally formed.

Referring to FIG. 4, a point where the transmitting bridge electrode TX_BE and the receiving bridge electrode RX_BE intersect is a touch node at which the transmitting touch electrode line TX_TEL and the receiving touch electrode line RX_TEL intersect. Therefore, the transmitting bridge electrode TX_BE and the receiving bridge electrode RX_BE should be located on different layers.

For example, as shown in FIG. 4, the transmitting bridge electrode TX_BE may be located on the same layer as the plurality of transmitting touch electrodes TX_TE, and the receiving bridge electrode RX_BE may be located on a different layer than the plurality of receiving touch electrodes RX_TE.

Conversely, the transmitting bridge electrode TX_BE may be located on a different layer from the plurality of transmitting touch electrodes TX_TE, and the receiving bridge electrode RX_BE may be located on the same layer as the plurality of receiving touch electrodes RX_TE.

Referring to FIG. 4, the touch sensor structure of the touch display device according to embodiments of the present disclosure may include a plurality of touch routing wires TX_TL and RX_TL.

The plurality of touch routing wires (TX_TL, RX_TL) may include a plurality of transmitting touch routing wires TX_TL and a plurality of receiving touch routing wires RX_TL. The plurality of transmitting touch routing wires TX_TL may electrically connect the plurality of transmitting touch electrode lines TX_TEL to the touch pad unit 211. The plurality of receiving touch routing wires RX_TL may electrically connect the plurality of receiving touch electrode lines RX_TEL to the touch pad unit 211.

The plurality of transmitting touch routing wires TX_TL may be electrically connected to the touch driving circuit 210 electrically connected to the touch pad unit 211 through the plurality of transmitting touch pads TX_TP included in the touch pad unit 211. Accordingly, the plurality of transmitting touch routing wires TX_TL may electrically connect the plurality of transmitting touch electrode lines TX_TEL to the touch driving circuit 210.

The plurality of receiving touch routing wires RX_TL may be electrically connected to the touch driving circuit 210 electrically connected to the touch pad unit 211 through the plurality of receiving touch pads RX_TP included in the touch pad unit 211. Accordingly, the plurality of receiving touch routing wires RX_TL may electrically connect the plurality of receiving touch electrode lines RX_TEL to the touch driving circuit 210.

The touch driving circuit 210 may supply a touch driving signal to at least one of the plurality of transmitting touch electrode lines TX_TEL and may sense at least one of the plurality of receiving touch electrode lines RX_TEL.

The transmitting touch electrode line TX_TEL may be referred to as a driving touch electrode line, and the receiving touch electrode line RX_TEL may also be referred to as a sensing touch electrode line.

Figure 5:
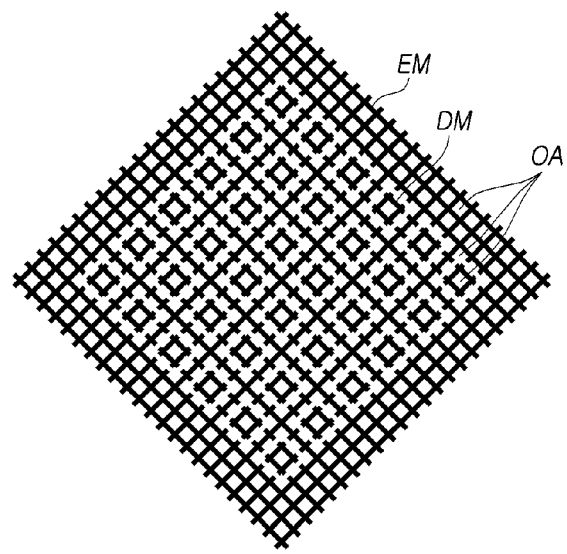
FIG. 5 illustrates a mesh-type touch sensor in the touch display device according to embodiments of the present disclosure.

FIG. 5 illustrates a mesh-type touch sensor in the touch display device according to embodiments of the present disclosure.

Referring to FIG. 5, the touch electrode lines (TX_TEL, RX_TEL) or the touch electrodes (TX_TE, RX_TE) included therein may be transparent electrodes or may be mesh-type electrodes.

When the touch electrode lines (TX_TEL, RX_TEL) or the touch electrodes (TX_TE, RX_TE) included therein may be mesh-type electrodes, the touch electrode lines (TX_TEL, RX_TEL) or the touch electrodes (TX_TE, RX_TE) may include a mesh-type electrode metal EM having one or more openings OA.

When the touch electrode lines (TX_TEL, RX_TEL) or the touch electrodes (TX_TE, RX_TE) included therein may be transparent electrodes, the touch electrode lines (TX_TEL, RX_TEL) or the touch electrodes (TX_TE, RX_TE) included therein may or may not have an opening OA.

Each of the plurality of openings OA present in the touch electrode lines (TX_TEL, RX_TEL) or the touch electrodes (TX_TE, RX_TE) may correspond to a light emitting area of one or more sub-pixels SP.

The plurality of openings OA may be paths through which light emitted from the plurality of sub-pixels SP disposed under the touch electrode lines (TX_TEL, RX_TEL) or the touch electrodes (TX_TE, RX_TE) may pass. Accordingly, even when the touch sensor structure is formed on the light emitting device ED, deterioration in light emitting performance due to the touch sensor structure can be prevented.

In the touch electrode lines (TX_TEL, RX_TEL) or the touch electrodes (TX_TE, RX_TE), the electrode metal EM excluding the plurality of openings OA may be positioned to overlap the bank positioned at the boundary between the light emitting areas of the sub-pixels SP. The bank may also be referred to as a pixel defining layer.

In the region where the touch electrode lines (TX_TEL, RX_TEL) or the touch electrodes (TX_TE, RX_TE) are formed, one or more dummy metals DM may exist in a form that is disconnected from the mesh-type electrode metal EM.

The electrode metal EM may be a part that actually functions as a touch sensor, and may be a part to which a touch driving signal is applied or a touch sensing signal is sensed by the touch driving circuit 210. However, the dummy metal DM may be a floating metal to which a touch driving signal is not applied and a touch sensing signal is not sensed. That is, the dummy metal DM may be an electrically floating and isolated metal.

Therefore, in the touch electrode lines (TX_TEL, RX_TEL) or the touch electrodes (TX_TE, RX_TE), the electrode metal EM may be electrically connected to the touch driving circuit 210, but the dummy metal DM may be not electrically connected to the touch driving circuit 210.

Regardless of the positions of the touch electrode lines (TX_TEL, RX_TEL) or the positions of the touch electrodes (TX_TE, RX_TE), the dummy metal DM may be present in the same ratio in an area of one touch electrode line (TX_TEL, RX_TEL) or one touch electrode (TX_TE, RX_TE).

Alternatively, according to the position of the touch electrode line (TX_TEL, RX_TEL) or the position of the touch electrode (TX_TE, RX_TE), the dummy metal DM may be present in different ratios in an area of one touch electrode line (TX_TEL, RX_TEL) or one touch electrode (TX_TE, RX_TE).

When at least one dummy metal DM does not exist and only the electrode metal EM exists in a mesh type in the area of the touch electrode lines (TX_TEL, RX_TEL) or the touch electrodes (TX_TE, RX_TE), a visibility issue in which the outline of the electrode metal EM is visible on the screen may occur.

In contrast, when one or more dummy metals DM are present in the area of the touch electrode lines (TX_TEL, RX_TEL) or the touch electrodes (TX_TE, RX_TE), a visibility issue in which the outline of the electrode metal EM is visible on the screen may be prevented.

In addition, by adjusting the presence, number, or ratio of the dummy metal DM in each area of the touch electrode lines (TX_TEL, RX_TEL) or the touch electrodes (TX_TE, RX_TE), an effective electrode area that affects the size of the mutual-capacitance for each touch node may be adjusted. Accordingly, the touch sensitivity may be improved by adjusting the size of the mutual-capacitance. Here, the ratio of the dummy metal DM in each touch electrode TE may be the ratio of the area occupied by the dummy metal DM in the area of the touch electrode TE. Alternatively, the ratio of the dummy metal DM in each of the touch electrodes or the touch electrode lines may be a ratio of the area of the electrode metal EM to the area of the dummy metal DM.

In the touch electrode lines (TX_TEL, RX_TEL) or the touch electrodes (TX_TE, RX_TE), the electrode metal EM and the dummy metal DM may be formed of the same material and positioned on the same layer. The electrode metal EM and the dummy metal DM may include the same touch sensor metal.

Figure 6:
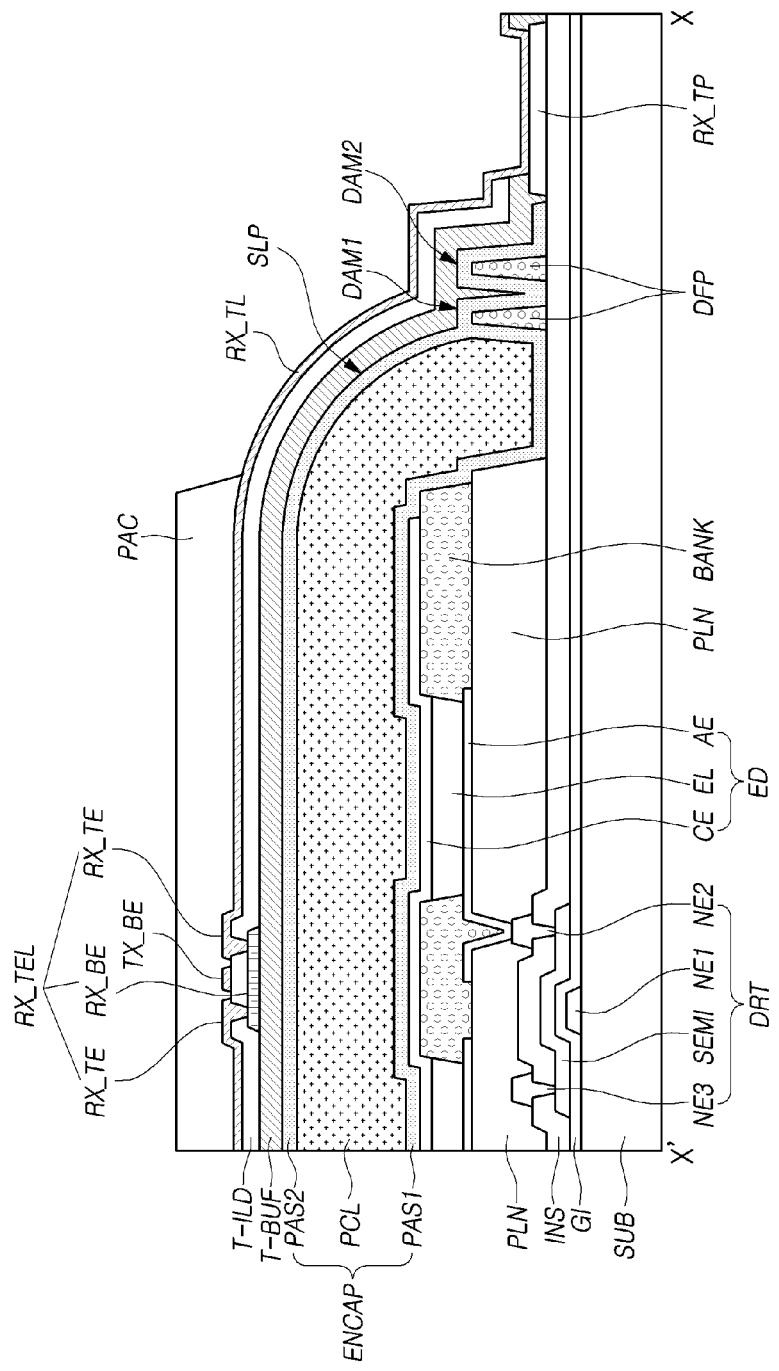
FIG. 6 is a cross-sectional view of the touch display device according to embodiments of the present disclosure.

FIG. 6 is a cross-sectional view of the display panel 110 of the touch display device according to embodiments of the present disclosure, and is a cross-sectional view taken along line X-X' of FIG. 4.

The driving transistor DRT in each sub-pixel SP in the display area DA may be disposed on the substrate SUB. For example, the substrate SUB may be a glass substrate or a flexible substrate such as a plastic substrate.

The driving transistor DRT may include a first node electrode NE1 corresponding to the gate node, a second node electrode NE2 corresponding to a source node or a drain node, and a third node electrode NE3 corresponding to the drain node or the source node. The driving transistor DRT may further include a semiconductor layer SEMI or the like.

A gate insulating layer GI may be positioned between the first node electrode NE1 and the semiconductor layer SEMI. The first node electrode NE1 and the semiconductor layer SEMI may overlap each other. The second node electrode NE2 may be formed on the insulating layer INS and may be electrically connected to one side of the semiconductor layer SEMI through a contact hole. The third node electrode NE3 may be formed on the insulating layer INS and may be electrically connected to the other side of the semiconductor layer SEMI through a contact hole.

The light emitting device ED may include an anode electrode AE corresponding to the pixel electrode, a light emitting layer EL on the anode electrode AE, and a cathode electrode CE corresponding to the common electrode and positioned on the light emitting layer EL.

The anode electrode AE may be electrically connected to the second node electrode NE2 of the driving transistor DRT through a contact hole penetrating the planarization layer PLN.

The light emitting layer EL may be formed on the anode electrode AE of the emission region corresponding to the opening of the bank. The light emitting layer EL may have a stack structure including a hole-related layer, an emission layer, an electron-related layer, and the like. The cathode electrode CE may be formed to face the anode electrode AE with the light emitting layer EL interposed therebetween.

The light emitting device ED may be vulnerable to moisture or oxygen. The encapsulation layer ENCAP may prevent the light emitting device ED from being exposed to moisture or oxygen. That is, the encapsulation layer ENCAP may prevent or at least reduce penetration of moisture or oxygen. The encapsulation layer ENCAP may be formed of one layer. Alternatively, as shown in FIG. 6, the encapsulation layer ENCAP may include a plurality of layers PAS1, PCL, and PAS2.

For example, when the encapsulation layer ENCAP includes a plurality of layers (PAS1, PCL, and PAS2), the encapsulation layer ENCAP may include one or more inorganic encapsulation layers PAS1 and PAS2 and at least one organic encapsulation layer PCL. As a specific example, the encapsulation layer ENCAP has a structure in which the first inorganic encapsulation layer PAS1, the organic encapsulation layer PCL, and the second inorganic encapsulation layer PAS2 are sequentially stacked.

The organic encapsulation layer PCL may further include at least one organic encapsulation layer or at least one inorganic encapsulation layer.

The first inorganic encapsulation layer PAS1 may be disposed on the cathode electrode CE and disposed closest to the light emitting device ED. The first inorganic encapsulation layer PAS1 may be formed of an inorganic insulating material capable of low-temperature deposition. For example, the first inorganic encapsulation layer PAS1 may be made of silicon nitride (SiNx), silicon oxide (SiOx), silicon oxynitride (SiON), or aluminum oxide (Al2O3). Accordingly, since the first inorganic encapsulation layer PAS1 is deposited in a low temperature atmosphere, it is possible to prevent damage to the light emitting layer EL including an organic material vulnerable to a high temperature atmosphere, during the deposition process of the first inorganic encapsulation layer PAS1.

The organic encapsulation layer PCL may have a smaller area than the first inorganic encapsulation layer PAS1. In this case, the first inorganic encapsulation layer PAS1 may be disposed to extend to the outside of the organic encapsulation layer PCL. The organic encapsulation layer PCL may serve as a buffer for relieving stress between layers due to bending of the touch display device, which is an organic light emitting display device, and may serve to enhance planarization performance. For example, the organic encapsulation layer PCL may be an acrylic resin, an epoxy resin, polyimide, polyethylene, or silicon oxycarbon (SiOC), and may be formed of an organic insulating material. For example, the organic encapsulation layer PCL may be formed through an inkjet method.

In order to prevent or at least reduce collapsing of the encapsulation layer ENCAP, the display panel 110 may further include one or more dams DAM1 and DAM2 located in the vicinity of the outermost point of the slope SLP of the encapsulation layer ENCAP.

One or more dams DAM1 and DAM2 may exist at or near the boundary point between the display area DA and the non-display area NDA. For example, the one or more dams DAM1 and DAM2 may be located at or near an end point of the slope (also called inclined surface) SLP of the encapsulation layer ENCAP.

One or more dams DAM1 and DAM2 may be disposed between the touch pad unit 211 including the touch pad RX_TP and the display area DA. The one or more dams DAM1 and DAM2 may be formed of a dam formation pattern DFP or the like. For example, the dam formation pattern DFP may include the same material as the bank BANK.

One or more dams DAM1 and DAM2 may be located only in the non-display area NDA. Alternatively, most of the one or more dams DAM1 and DAM2 may exist in the non-display area NDA, and a remaining part of the one or more dams DAM1 and DAM2 may span the display area DA.

When two or more dams DAM1 and DAM2 are formed to prevent or at least reduce collapsing of the encapsulation layer ENCAP, the two or more dams DAM1 and DAM2 may include a primary dam DAM1 and a secondary dam DAM2. The primary dam DAM1 may be a dam located closest to the display area DA. The secondary dam DAM2 may be a dam located close to the display area DA after the primary dam DAM1. The primary dam DAM1 may be located relatively closer to the display area DA than the secondary dam DAM2. The secondary dam DAM2 may be located relatively closer to the touch pad unit 211 than the primary dam DAM1.

When the liquid organic encapsulation layer PCL is dropped in the display area DA, the liquid organic encapsulation layer PCL may collapse in the direction of the non-display area NDA. The collapsed organic encapsulation layer PCL may invade the pad area and cover the touch pad unit 211 and the like. The collapse of the organic encapsulation layer PCL may be prevented or at least reduced by one or more dams DAM1 and DAM2. This may be further increased when two or more dams DAM1 and DAM2 are formed, as shown in FIG. 6.

The primary dam DAM1 and/or the secondary dam DAM2 may be formed in a single-layer or multi-layer structure. The primary dam DAM1 and/or the secondary dam DAM2 may be basically made of a dam formation pattern DFP. The dam formation pattern DFP may have a higher height than the touch pad RX_TP disposed on the touch pad unit 211.

The dam formation pattern DFP may be formed of the same material as a bank BANK for separating the sub-pixels SP from each other, or may be formed of the same material as a spacer for maintaining an interlayer gap. In this case, the dam formation pattern DFP may be formed simultaneously with the bank BANK or the spacer. Accordingly, the dam structure can be formed without a mask addition process and cost increase.

Referring to FIG. 6, the first dam DAM1 and/or the second dam DAM2 may have a multi-layered structure in which the first inorganic encapsulation layer PAS1 and/or the second inorganic encapsulation layer PAS2 are stacked on the dam formation pattern DFP.

The organic encapsulation layer PCL including organic material may be located on the inner side of the innermost primary dam DAM1 but not on the outer side of the primary DAM1. That is, the organic encapsulation layer PCL may not exist on all of the dams DAM1 and DAM2. Alternatively, the organic encapsulation layer PCL including an organic material may be located on at least the first dam DAM1 among the first dam DAM1 and the second dam DAM2. The organic encapsulation layer PCL may be extended only to the upper portion of the primary dam DAM1. Alternatively, the organic encapsulation layer PCL may be extended to the upper portion of the primary dam DAM1, and may extend past the upper portion of the primary dam DAM1 and extend to the upper portion of the secondary dam DAM2.

The second inorganic encapsulation layer PAS2 may be disposed to cover an upper surface and a side surface of each of the organic encapsulation layer PCL and the first inorganic encapsulation layer PAS1. The second inorganic encapsulation layer PAS2 minimizes or blocks penetration of external moisture or oxygen into the first inorganic encapsulation layer PAS1 and the organic encapsulation layer PCL.

Referring to FIG. 6, a touch sensor may be disposed on the encapsulation layer ENCAP. A touch buffer layer T-BUF may be additionally disposed between the encapsulation layer ENCAP and the touch sensor.

Referring to FIGS. 6 and 4 together, the touch sensor may include touch electrode lines TX_TEL and RX_TEL and touch routing wires TX_TL and RX_TL. Each of the touch electrode lines TX_TEL and RX_TEL may include touch electrodes TX_TE and RX_TE and bridge electrodes TX_BE and RX_BE.

The touch electrode lines TX_TEL and RX_TEL may include transmitting touch electrode lines TX_TEL and receiving touch electrode lines RX_TEL. Each transmitting touch electrode line TX_TEL may include transmitting touch electrodes TX_TE and transmitting bridge electrodes TX_BE. Each receiving touch electrode line RX_TEL may include receiving touch electrodes RX_TE and receiving bridge electrodes RX_BE.

The touch routing wires TX_TL and RX_TL may include transmitting touch routing wires TX_TL and receiving touch routing wires RX_TL. All or part of the receiving touch routing wire RX_TL may be disposed on the touch buffer layer T-BUF. All or part of the transmitting touch routing line TX_TL may be disposed on the touch buffer layer T-BUF.

Since the touch sensor is positioned on the encapsulation layer ENCAP, which is an insulating material layer, a parasitic capacitance may be formed between the touch sensor and the cathode electrode CE.

When the touch buffer layer T-BUF is additionally disposed between the encapsulation layer ENCAP and the touch sensor (RX_TE, RX_BE, TX_TE, TX_BE), the separation distance between the touch sensor (RX_TE, RX_BE, TX_TE, TX_BE) and the cathode electrode CE may be further increased due to the thickness of the touch buffer layer T-BUF. For example, the separation distance between the touch sensor (RX_TE, RX_BE, TX_TE, TX_BE) and the cathode electrode CE may be equal to or greater than a predetermined minimum separation distance (e.g., 5 µm) or may be a predetermined optimal separation distance.

When the touch buffer layer T-BUF is additionally disposed between the encapsulation layer ENCAP and the touch sensor (RX_TE, RX_BE, TX_TE, TX_BE), parasitic capacitance between the touch sensor and the cathode electrode CE may be further reduced. Accordingly, it is possible to further improve the touch sensitivity due to the parasitic capacitance.

The touch buffer layer T-BUF may not exist on the encapsulation layer ENCAP. That is, the touch buffer layer T-BUF may not be disposed between the encapsulation layer ENCAP and the touch sensor.

During the manufacturing process of the touch sensor, a chemical solution (developer or etchant, etc.) used in the process or moisture from the outside may be generated. By disposing the touch buffer layer T-BUF and disposing the touch sensor thereon, it is possible to prevent or at least reduce the chemical solution or moisture from penetrating into the light emitting layer EL including an organic material during the manufacturing process of the touch sensor. Accordingly, the touch buffer layer T-BUF may prevent or at least reduce damage to the light emitting layer EL, which is vulnerable to the chemical solution or moisture.

In order to prevent or at least reduce damage to the light emitting layer EL containing organic materials that are vulnerable to high temperatures, the touch buffer layer T-BUF may be formed at a low temperature below a certain temperature (e.g., 100 degrees (° C.)) and may be formed of an organic insulating material having a low dielectric constant of 1 to 3. As the organic light emitting display device is bent, each of the encapsulation layers PAS1, PCL, and PAS2 in the encapsulation layer ENCAP may be damaged, and the metal (hereinafter referred to as touch sensor metal) constituting the touch sensor positioned on the touch buffer layer T-BUF may be broken. Even when the organic light emitting display device is bent, the touch buffer layer T-BUF made of an organic insulating material and having planarization performance may prevent damage to the encapsulation layer ENCAP and/or breakage of the touch sensor metal.

In the mutual-capacitance-based touch sensor structure, the transmitting touch electrode line TX_TEL and the receiving touch electrode line RX_TEL may cross each other.

Referring to FIGS. 6 and 4 together, each receiving touch electrode line RX_TEL may include a plurality of receiving touch electrodes RX_TE and a plurality of receiving bridge electrodes RX_BE. The plurality of receiving bridge electrodes RX_BE may electrically connect adjacent receiving touch electrodes RX_TE among the plurality of receiving touch electrodes RX_TE to each other.

The receiving touch electrodes RX_TE and the receiving bridge electrodes RX_BE may be located on different layers with the touch interlayer insulating layer T-ILD interposed therebetween. That is, the touch interlayer insulating layer T-ILD may be disposed between the receiving touch electrodes RX_TE and the receiving bridge electrodes RX_BE.

The reception bridge electrode RX_BE may be formed on the touch buffer layer T-BUF. The receiving bridge electrode RX_BE may be electrically connected to adjacent receiving touch electrodes RX_TE positioned on the touch interlayer insulating layer T-ILD through a contact hole of the touch interlayer insulating layer T-ILD. The reception bridge electrode RX_BE may be disposed to overlap the bank BANK. Accordingly, a decrease (reduction) in the aperture ratio by the reception bridge electrode RX_BE may be prevented.

Referring to FIGS. 6 and 4 together, each transmitting touch electrode line TX_TEL may include a plurality of transmitting touch electrodes TX_TE and a plurality of transmitting bridge electrodes TX_BE. The plurality of transmitting bridge electrodes TX_BE may electrically connect adjacent transmitting touch electrodes TX_TE among the plurality of transmitting touch electrodes TX_TE to each other.

The plurality of transmitting touch electrodes TX_TE and the plurality of transmitting bridge electrodes TX_BE may be positioned on different layers with the touch interlayer insulating layer T-ILD interposed therebetween. That is, the touch interlayer insulating layer T-ILD may be positioned between the plurality of transmitting touch electrodes TX_TE and the plurality of transmitting bridge electrodes TX_BE. Alternatively, the plurality of transmitting touch electrodes TX_TE and the plurality of transmitting bridge electrodes TX_BE may be integrally formed and disposed on the touch interlayer insulating layer T-ILD.

Referring to FIGS. 6 and 4 together, the receiving touch electrode line RX_TEL may be electrically connected to the receiving touch pad RX_TP existing in the touch pad unit 211 in the non-display area NDA through the receiving touch routing wire RX_TL. Similarly, the transmitting touch electrode line TX_TEL may be electrically connected to the transmitting touch pad TX_TP existing in the touch pad unit 211 in the non-display area NDA through the transmitting touch routing line TX_TL.

The receiving touch pad RX_TP included in the touch pad unit 211 may be electrically connected to the touch driving circuit 210. The transmitting touch pad TX_TP included in the touch pad unit 211 may be electrically connected to the touch driving circuit 210.

The receiving touch pad RX_TP may be formed separately from the receiving touch routing wire RX_TL. Alternatively, the receiving touch pad RX_TP may be formed by extending the receiving touch routing wire RX_TL. The transmitting touch pad TX_TP may be formed separately from the transmitting touch routing line TX_TL. Alternatively, the transmitting touch pad TX_TP may be formed by extending the transmitting touch routing line TX_TL.

At least one of the receiving touch pad RX_TP, the receiving touch routing wiring RX_TL, the transmitting touch pad TX_TP, and the transmitting touch routing wiring TX_TL may include one or more first conductive materials, and may be formed in a single-layer structure or a multi-layer structure. For example, the first conductive material may include Al, Ti, Cu, Mo, or the like, and may be a metal having strong corrosion resistance, strong acid resistance, and good conductivity.

At least one of the receiving touch pad RX_TP, the receiving touch routing wiring RX_TL, the transmitting touch pad TX_TP, and the transmitting touch routing wiring TX_TL may include first conductive materials, and may be formed in a three-layer stacked structure (three-layer laminated structure). For example, the three-layer stacked structure may be formed of Ti/Al/Ti or Mo/Al/Mo.

The pad cover electrode capable of covering the receiving touch pad RX_TP and the transmitting touch pad TX_TP may include one or more second conductive materials. The second conductive material may include a transparent conductive material (e.g., ITO (indium tin oxide), IZO (indium zinc oxide), etc.) having strong corrosion resistance and strong acid resistance. All or part of the pad cover electrode may be exposed through the opening of the touch buffer layer T-BUF. The exposed portion of the pad cover electrode may be bonded to the touch driving circuit 210 or may be bonded to the circuit film on which the touch driving circuit 210 is mounted. The second conductive material may also be included in the touch sensors TX_TE, RX_TE, TX_BE, and RX_BE.

The touch buffer layer T-BUF may be formed to cover the touch sensor metal to prevent the touch sensor metal from being corroded by external moisture. For example, the touch buffer layer T-BUF may be formed of an organic insulating material, a circularly polarizing plate, or a film made of an epoxy or acrylic material. The touch buffer layer T-BUF may not be on the encapsulation layer ENCAP. That is, the touch buffer layer T-BUF may not have an essential layer configuration.

Referring to FIG. 6, the receiving touch routing wire RX_TL may be electrically connected with the receiving touch electrode line RX_TEL, extend along the slope SLP of the encapsulation layer ENCAP, pass over the top of the at least one dam DAM1 and DAM2, and be electrically connected with the receiving touch pad RX_TP included in the touch pad unit 211.

Similarly, the transmitting touch routing wire TX_TL may be electrically connected with the transmitting touch electrode line TX_TEL, extend along the slope SLP of the encapsulation layer ENCAP, pass over the top of the at least one dam DAM1 and DAM2, and be electrically connected with the transmitting touch pad TX_TP included in the touch pad unit 211.

A touch protection layer PAC may be disposed on the transmitting touch electrode lines TX_TEL and the receiving touch electrode lines RX_TEL. The touch protection layer PAC may extend before or after one or more of the dams DAM1 and DAM2, and may also be disposed on the transmitting touch routing wires TX_TL and the receiving touch routing wires RX_TL.

Meanwhile, the cross-sectional view of FIG. 6 conceptually shows the structure, and the position, thickness, or width of each pattern may vary depending on the viewing direction or position, and the connection structure of various patterns (e.g., various layers or various electrodes) may also be changed. In addition, additional layers may exist, and some of the illustrated layers may be omitted or integrated. For example, the width of the bank BANK may be narrower than the width represented in FIG. 6, and the heights of the dams DAM1 and DAM2 may be lower or higher than the height represented in FIG. 6.

Figure 7:
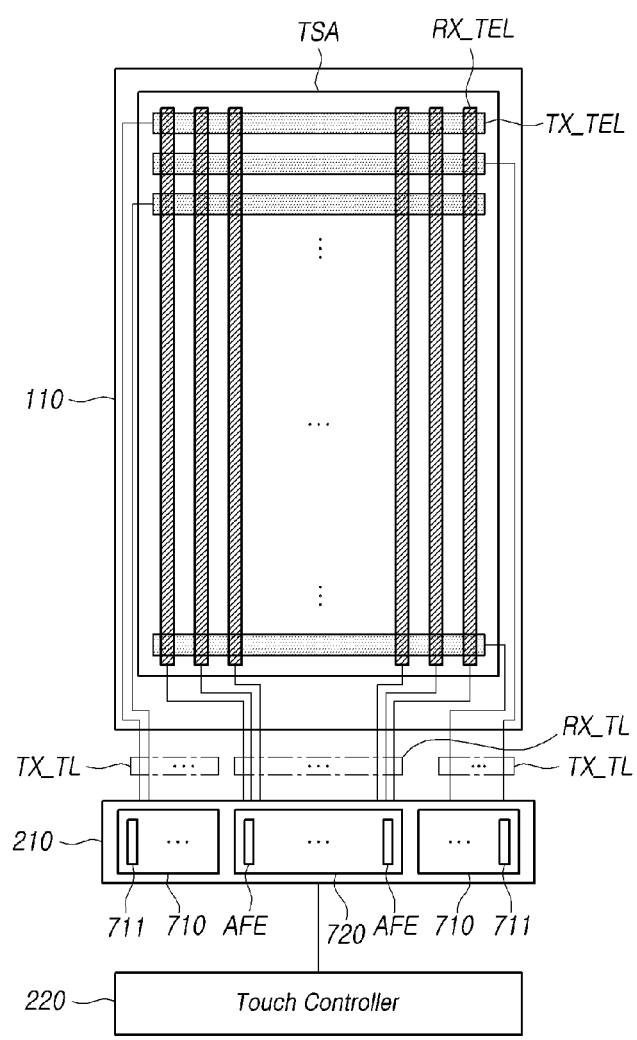
FIG. 7 illustrates internal circuits of a touch driving circuit in a touch sensing system of the touch display device according to embodiments of the present disclosure.

FIG. 7 illustrates internal circuits 710 and 720 of the touch driving circuit 210 in a touch sensing system of the touch display device according to embodiments of the present disclosure. The structure of the touch sensor of FIG. 7 is the same as the structure of the touch sensor of FIG. 3. However, in FIG. 7, the touch pad unit 211 is omitted.

Referring to FIG. 7, the touch driving circuit 210 may include a transmitting circuit 710 electrically connected to the transmitting touch electrode lines TX_TEL and a receiving circuit 720 electrically connected to the receiving touch electrode lines RX_TEL.

The transmitting circuit 710 may include signal output circuits 711 configured to supply touch driving signal to the transmitting touch electrode lines TX_TEL. For example, the signal output circuits 711 may include an output buffer or an amplifier.

The receiving circuit 720 may include analog front ends AFE connected to the receiving touch electrode lines RX_TEL.

The transmitting circuit 710 and the receiving circuit 720 may be electrically connected to the touch controller 220.

The touch controller 220 may control the operation of the transmitting circuit 710 and/or the receiving circuit 720. For example, the touch controller 220 may provide a touch synchronization signal defining timing of a touch driving operation to the transmitting circuit 710 and/or the receiving circuit 720.

The touch controller 220 may provide a touch driving signal to the transmitting circuit 710. The touch controller 220 may receive touch sensing data from the receiving circuit 720.

Figure 8:
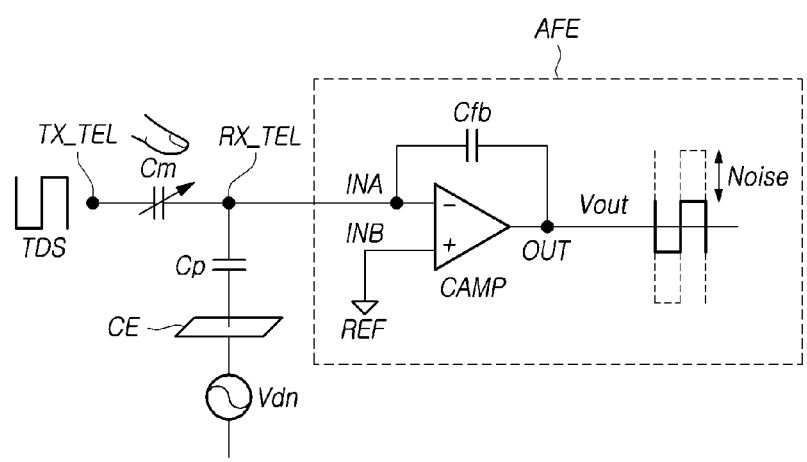
FIG. 8 illustrates an analog front end included in a receiving circuit of the touch driving circuit of the touch display device according to embodiments of the present disclosure.

FIG. 8 illustrates an analog front end AFE included in the receiving circuit 720 of the touch driving circuit 210 of the touch display device according to embodiments of the present disclosure.

Referring to FIG. 8, the analog front end AFE may include a charge amplifier (CAMP) or the like. The charge amplifier CAMP may be electrically connected to the receiving touch electrode line RX_TEL.

The charge amplifier CAMP may include an operational amplifier having a first input terminal INA, a second input terminal INB, and an output terminal OUT. The charge amplifier CAMP may further include a feedback capacitor Cfb connected between the first input terminal INA and the output terminal OUT.

The first input terminal INA of the charge amplifier CAMP may be electrically connected to the receiving touch electrode line RX_TEL. A reference voltage REF may be applied to the second input terminal INB of the charge amplifier CAMP. An output signal Vout may be output from the output terminal OUT of the charge amplifier CAMP.

The receiving touch electrode line RX_TEL electrically connected to the first input terminal INA of the charge amplifier CAMP may form a mutual-capacitance Cm with the transmitting touch electrode line TX_TEL.

The transmitting touch electrode line TX_TEL may be in a state to which the touch driving signal TDS is applied. The touch driving signal TDS may be a signal that swings with a predetermined frequency and amplitude, and may be a signal whose voltage level changes with time.

The mutual-capacitance Cm formed between the receiving touch electrode line RX_TEL and the transmitting touch electrode line TX_TEL may vary depending on whether a touch occurs in the vicinity.

A charge corresponding to the mutual-capacitance Cm may flow into the first input terminal INA of the charge amplifier CAMP through the receiving touch electrode line RX_TEL. The charge flowing into the first input terminal INA of the charge amplifier CAMP may be charged in the feedback capacitor Cfb of the charge amplifier CAMP.

The charge amplifier CAMP may output a voltage corresponding to the amount of charge charged in the feedback capacitor Cfb as an output signal Vout through the output terminal OUT.

As shown in the cross-sectional structure of FIG. 6, since the touch sensor is positioned on the encapsulation layer ENCAP, a parasitic capacitance Cp may be formed between the touch sensor and the cathode electrode CE. Accordingly, as shown in FIG. 8, a parasitic capacitance Cp may be formed between the receiving touch electrode line RX_TEL, which is a type of touch sensor, and the cathode electrode CE. That is, the receiving touch electrode lines RX_TEL and the cathode electrode CE may be coupled in a capacitive manner.

Ideally, the cathode electrode CE may maintain a voltage state at the base voltage EVSS having a constant voltage level. However, in reality, the voltage of the cathode electrode CE may not be constantly maintained.

For example, voltage fluctuations may occur in electrodes or wires in the vicinity of the cathode electrode CE according to display driving. Such voltage fluctuations may act as display noise Vdn from the viewpoint of the cathode electrode CE, and may cause voltage fluctuations at the cathode electrode CE.

For another example, a voltage change at the cathode electrode CE may be generated even by an external or internal electrical noise of the touch display device.

When a voltage fluctuation occurs in the cathode electrode CE due to various factors, an unwanted voltage fluctuation may also occur in the receiving touch electrode line RX_TEL that is capacitively coupled to the cathode electrode CE. Accordingly, unwanted voltage fluctuations may occur even in the output signal Vout output from the charge amplifier CAMP. Unwanted voltage fluctuations are called noise. As a result, a phenomenon in which touch sensitivity is lowered due to unwanted voltage fluctuations (noise) may occur.

As the area of the display panel 110 increases, the above-described decrease in touch sensitivity may occur more severely.

Accordingly, the touch display apparatus according to embodiments of the present disclosure may provide an advanced touch sensing system robust to noise.

Figure 9:
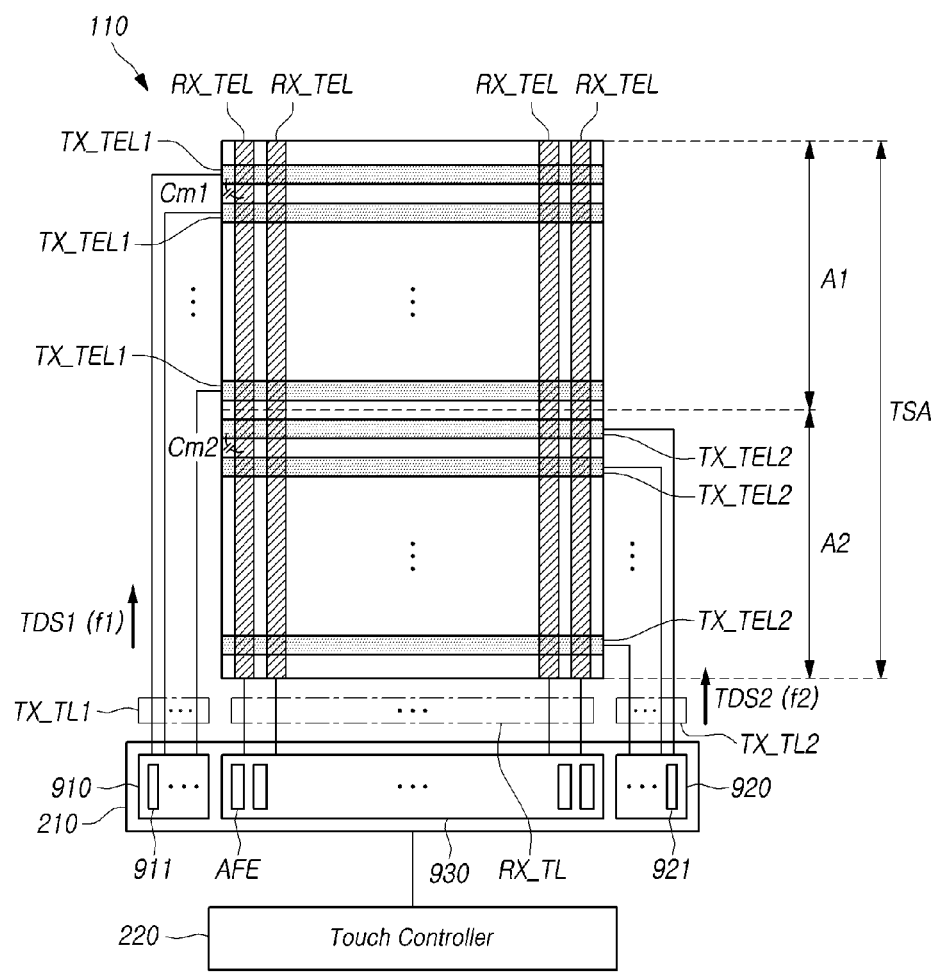
FIG. 9 illustrates an advanced touch sensing system of the touch display device according to embodiments of the present disclosure.
Figure 10:
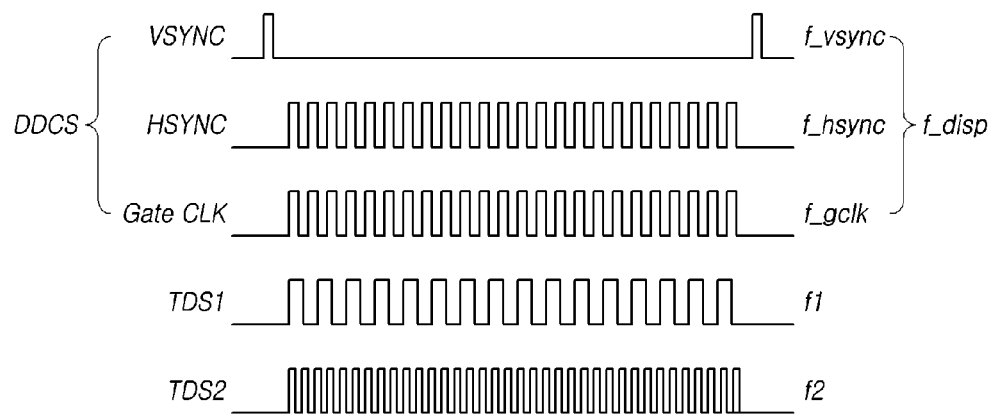
FIG. 10 illustrates a first touch driving signal and a second touch driving signal to which a touch driving frequency avoidance design technique for a grouped touch sensor structure is applied in the advanced touch sensing system of the touch display device according to embodiments of the present disclosure.

FIG. 9 illustrates an advanced touch sensing system of the touch display device according to embodiments of the present disclosure. FIG. 10 illustrates a first touch driving signal TDS1 and a second touch driving signal TDS2 to which a touch driving frequency avoidance design technique for a grouped touch sensor structure is applied in the advanced touch sensing system of the touch display device according to embodiments of the present disclosure.

Referring to FIG. 9, an advanced touch sensing system of a touch display device according to embodiments of the present disclosure may include a touch sensor and a touch circuit.

An advanced touch sensing system according to embodiments of the present disclosure may provide touch sensing robust to noise. To this end, the touch sensor may have a structure resistant to noise. In the advanced touch sensing system according to embodiments of the present disclosure, the noise-resistant touch sensor structure may be a grouped touch sensor structure.

Referring to FIG. 9, the touch sensing area TSA of the display panel 110 may be divided into two (A1 and A2) or more areas. For example, the touch sensing area TSA of the display panel 110 may be divided into a first area A1 and a second area A2. The first area A1 and the second area A2 are non-overlapping in one embodiment. Hereinafter, for convenience of description, it is assumed that the touch sensing area TSA of the display panel 110 is divided into two areas A1 and A2. However, the present invention is not limited thereto, and the touch sensing area TSA of the display panel 110 may be divided into two or three or more areas.

Referring to FIG. 9, when the touch sensing area TSA is divided into a first area A1 and a second area A2, the touch sensors grouped to be robust against noise may include a first touch sensor group and a second touch sensor group.

The first touch sensor group may include a plurality of first touch electrode lines TX_TEL1 disposed in the first area A1, and the second touch sensor group may include a plurality of second touch electrode lines TX_TEL2 disposed in a second area A2 different from the first area A1. The plurality of first touch electrode lines TX_TEL1 disposed in the first area A1 and the plurality of second touch electrode lines TX_TEL2 disposed in the second area A2 may be referred to as driving touch electrode lines or driving touch electrodes.

Referring to FIG. 9, for driving the grouped touch sensors, the touch driving circuit 210 may operate in a unique way and may have a unique circuit structure.

Referring to FIG. 9, the touch driving circuit 210 according to the embodiments of the present disclosure may supply the first touch driving signal TDS1 having the first touch driving frequency f1 to at least one of the plurality of first touch electrode lines TX_TEL1 disposed in the first area A1. The touch driving circuit 210 according to embodiments of the present disclosure may supply the second touch driving signal TDS2 having the second touch driving frequency f2 to at least one of the plurality of second touch electrode lines TX_TEL2 disposed in the second area A2. The first touch driving frequency f1 and the second touch driving frequency f2 may be different from each other. For reference, briefly, the first touch driving frequency f1 may be referred to as a first touch driving frequency, and the second touch driving frequency f2 may also be referred to as a second touch driving frequency.

Referring to FIG. 9, the touch driving circuit 210 according to embodiments of the present disclosure may include a first transmitting circuit 910 for driving the plurality of first touch electrode lines TX_TEL1 disposed in the first area A1, and a second transmitting circuit 920 for driving a plurality of second touch electrode lines TX_TEL2 disposed in the second area A2.

The first transmitting circuit 910 may supply the first touch driving signal TDS1 having the first touch driving frequency f1 to at least one first touch electrode line TX_TEL1 among the plurality of first touch electrode lines TX_TEL1 disposed in the first area A1 of the display panel 110.

The second transmitting circuit 920 may supply the second touch driving signal TDS2 having the second touch driving frequency f2 to at least one second touch electrode line TX_TEL2 among the plurality of second touch electrode lines TX_TEL2 disposed in the second area A2 different from the first area A1 of the display panel 110.

The first transmitting circuit 910 may include a plurality of first signal output circuits 911 configured to supply the first touch driving signal TDS1 to the plurality of first touch electrode lines TX_TEL1. For example, each of the plurality of first signal output circuits 911 may include an output buffer or an amplifier.

The second transmitting circuit 920 may include a plurality of second signal output circuits 921 configured to supply the second touch driving signal TDS2 to the plurality of second touch electrode lines TX_TEL2. For example, each of the plurality of second signal output circuits 921 may include an output buffer or an amplifier.

Referring to FIG. 10, the first touch driving frequency f1 of the first touch driving signal TDS1 and the second touch driving frequency f2 of the second touch driving signal TDS2 may be different from each other.

The first touch driving signal TDS1 and the second touch driving signal TDS2 may have various signal waveforms. For example, signal waveforms of the first touch driving signal TDS1 and the second touch driving signal TDS2 may include a sine wave, a square wave, or a triangular wave. However, it is not limited thereto.

The amplitude of each of the first touch driving signal TDS1 and the second touch driving signal TDS2 may be the same. Alternatively, amplitudes of the first touch driving signal TDS1 and the second touch driving signal TDS2 may be different from each other.

Referring to FIG. 10, each of the first touch driving frequency f1 of the first touch driving signal TDS1 and the second touch driving frequency f2 of the second touch driving signal TDS2 may be set to be different from a display driving frequency f_disp related to display driving.

For example, the display driving frequency f_disp may be the frequency of the display driving control signal DDCS.

The display driving control signal DDCS may exist or be used in the display driving system, and may include all signals necessary for driving (display driving) to display an image on the display panel 110. For example, the display driving control signal DDCS may be a signal output from at least one of the host system 150, the display controller 140, or a power/signal related circuit (e.g., power management integrated circuits, level shifters, etc.).

Referring to FIG. 10, the driving timing of the plurality of data lines DL and/or the driving timing of the plurality of gate lines GL may be controlled by the display driving control signal DDCS.

As described above, the display panel 110 may include a touch sensor as well as the plurality of data lines DL and the plurality of gate lines GL.

The display driving circuit configured to drive the display panel 110 may include one or more of the data driving circuit 120, the gate driving circuit 130, the display controller 140, the host system 150, and the like.

The display driving circuit may drive the plurality of data lines DL and the plurality of gate lines GL to display an image on the display panel 110 based on the display driving control signal DDCS.

While the display driving circuit performs a driving operation based on the display driving control signal DDCS to display an image on the display panel 110, the touch driving circuit 210 may output at least one of the first touch driving signal TDS1 and the second touch driving signal TDS2 to the touch sensor. That is, the display driving and the touch driving may be performed independently and/or simultaneously.

For example, referring to FIG. 10, the display driving control signal DDCS may include a horizontal synchronization signal HSYNC or a gate clock signal Gate CLK. The display driving frequency f_disp may include a frequency f_hsync of the horizontal synchronization signal HSYNC or a frequency f_gclk of the gate clock signal Gate CLK. Each of the first touch driving frequency f1 and the second touch driving frequency f2 may be set differently from the display driving frequency f_disp. Each of the first touch driving frequency f1 and the second touch driving frequency f2 may be set differently from the frequency f_hsync of the horizontal synchronization signal HSYNC or the frequency f_gclk of the gate clock signal Gate CLK.

The vertical synchronization signal VSYNC and the horizontal synchronization signal HSYNC may be control signals provided from the host system 150 to the display controller 140. The display controller 140 may control data driving and gate driving based on the vertical sync signal VSYNC and the horizontal sync signal HSYNC.

The vertical synchronization signal VSYNC may be a signal indicating frame timing. The vertical synchronization signal VSYNC may include a plurality of pulses. In the vertical sync signal VSYNC, each pulse may indicate the start of one frame. That is, the time between two adjacent pulses in the vertical synchronization signal VSYNC may correspond to one frame time.

The frequency f_vsync of the vertical synchronization signal VSYNC may correspond to the display frame frequency. For example, the frequency f_vsync of the vertical synchronization signal VSYNC may be one or more frequencies belonging to a range of 60 Hz to 90 Hz.

The horizontal synchronization signal HSYNC may be a signal indicating driving timing of each of a plurality of sub-pixel lines. The horizontal synchronization signal HSYNC may include a plurality of pulses. In the horizontal synchronization signal HSYNC, each pulse may indicate driving timing for one sub-pixel row. The plurality of sub-pixel lines may be referred to as a plurality of sub-pixel rows.

The frequency f_hsync of the horizontal synchronization signal HSYNC may be a frequency for driving a plurality of sub-pixel lines during one frame time. The frequency f_hsync of the horizontal synchronization signal HSYNC may vary depending on the frequency f_vsync of the vertical synchronization signal VSYNC or the resolution of the display panel 110. For example, the frequency f_hsync of the horizontal synchronization signal HSYNC may be one or more frequencies belonging to a range of 140 KHz to 230 KHz.

The gate clock signal Gate CLK may be a clock signal necessary to generate gate signals for driving the plurality of gate lines GL disposed on the plurality of sub-pixel lines.

For example, the gate clock signals Gate CLK may be clock signals generated by the level shifter 160 and supplied to the gate driving circuit 130. The gate driving circuit 130 may generate gate signals based on the gate clock signals Gate CLK received from the level shifter 160, and may output the generated gate signals to the gate lines GL according to a predetermined gate driving timing.

Unlike the above description, the gate clock signal Gate CLK may not be a clock signal output from the level shifter 160, but may be a clock signal required to generate a clock signal output from the level shifter 160.

The display driving frequency f_disp may be not only the frequency of the display driving control signal DDCS, but also the frequency of voltage fluctuations of an electrical signal or noise generated in connection with display driving in the touch display device.

For example, the display driving frequency f_disp may be a frequency of voltage fluctuation of an electrical signal or noise in the display panel 110.

As another example, the display driving frequency f_disp may be a frequency of voltage fluctuations of electrical signals or noises in circuit components (e.g., printed circuits, printed circuit boards, etc.) connected to the display panel 110.

As another example, the display driving frequency f_disp may be a frequency of voltage fluctuations in peripheral electrodes or peripheral signal lines related to display driving. The peripheral electrode or the peripheral signal line may overlap the cathode electrode CE of the light emitting device ED of the display panel 110. For example, the peripheral electrode may include an anode electrode AE or the like, and the peripheral signal line may include a data line DL or a gate line GL.

Referring to FIG. 9, the first area A1 may be located farther from the touch driving circuit 210 than the second area A2. That is, based on the position of the touch pad unit 211 to which the touch driving circuit 210 is connected with respect to the display panel 110, the first area A1 may be located farther than the second area A2.

The relative positional relationship between the first area A1 and the second area A2 and the magnitude relationship between the first touch driving frequency f1 and the second touch driving frequency f2 may or may not be related.

For example, the first touch driving frequency f1 of the first touch driving signal TDS1 applied to the first touch sensor group in the first area A1 may be less than the second touch driving frequency f2 of the second touch driving signal TDS2 applied to the second touch sensor group in the second area A2.

In another example, the first touch driving frequency f1 of the first touch driving signal TDS1 applied to the first touch sensor group in the first area A1 may be greater than the second touch driving frequency f2 of the second touch driving signal TDS2 applied to the second touch sensor group in the second area A2.

The difference between the first touch driving frequency f1 and the second touch driving frequency f2 may be set to be greater than or equal to a predetermined minimum frequency difference value. Accordingly, electrical crosstalk between the first touch electrode line TX_TEL1 to which the first touch driving signal TDS1 is applied and the second touch electrode line TX_TEL2 to which the second touch driving signal TDS2 is applied may be prevented or at least reduced.

Referring to FIG. 9, in the advanced touch sensing system according to embodiments of the present disclosure, the grouped touch sensor may further include a plurality of ungrouped third touch electrode lines RX_TEL. The third touch electrode lines RX_TEL may also be referred to as sensing touch electrode lines or sensing touch electrodes.

The plurality of third touch electrode lines RX_TEL may be disposed over the first area A1 and the second area A2. Each of the plurality of third touch electrode lines RX_TEL may cross the plurality of first touch electrode lines TX_TEL1 in the first area A1, and may cross the plurality of second touch electrode lines TX_TEL2 in the second area A2.

Referring to FIG. 9, the plurality of first touch electrode lines TX_TEL1 and the plurality of second touch electrode lines TX_TEL2 may be parallel to the plurality of gate lines GL and may cross the plurality of data lines DL.

In this case, the plurality of third touch electrode lines RX_TEL may be parallel to the plurality of data lines DL and may cross the plurality of gate lines GL.

As another example, the plurality of first touch electrode lines TX_TEL1 and the plurality of second touch electrode lines TX_TEL2 may be parallel to the plurality of data lines DL and may cross the plurality of gate lines GL.

In this case, the plurality of third touch electrode lines RX_TEL may be parallel to the plurality of gate lines GL and may cross the plurality of data lines DL.

Referring to FIG. 9, the touch driving circuit 210 may include a receiving circuit 930 configured to sense the plurality of third touch electrode lines RX_TEL. The receiving circuit 930 may include a plurality of analog front ends AFE connected to the plurality of third touch electrode lines RX_TEL.

In the grouped touch sensor, the plurality of first touch electrode lines TX_TEL1 and the plurality of second touch electrode lines TX_TEL2 may be transmitting touch electrode lines, and the plurality of third touch electrode lines RX_TEL may be receiving touch electrode lines.

Referring to FIGS. 9 and 6 together, the display panel 110 may include a light emitting device ED and an encapsulation layer ENCAP on the light emitting device ED. In grouped touch sensors, the plurality of first touch electrode lines TX_TEL1 and the plurality of second touch electrode lines TX_TEL2 may be positioned on the encapsulation layer ENCAP, and the plurality of third touch electrode lines RX_TEL may be positioned on the encapsulation layer ENCAP.

Referring to FIGS. 9 and 6 together, the display panel 110 includes a touch pad unit 211, at least one dam DAM1 and DAM2, a plurality of first touch routing wires TX_TL1, and it may further include a plurality of second touch routing wires TX_TL2. The touch pad unit 211 may include a plurality of touch pads to which the touch driving circuit 210 is electrically connected. The at least one dam DAM1 and DAM2 may be located near the outermost point of the slope SLP of the encapsulation layer ENCAP. The plurality of first touch routing wires TX_TL1 may be connected to the plurality of first touch electrode lines TX_TEL1, may extend along the slope SLP of the encapsulation layer ENCAP, pass over at least one dam DAM1 and DAM2, and may be electrically connected to the touch pad unit 211. The plurality of second touch routing wires TX_TL2 may be connected to the plurality of second touch electrode lines TX_TEL2, may extend along the slope SLP of the encapsulation layer ENCAP, pass over at least one dam DAM1 and DAM2, and may be electrically connected to the touch pad unit 211.

As described above, when the grouped touch sensors are disposed on the encapsulation layer (ENCAP), the display driving frequency f_disp may be a frequency of voltage fluctuations in peripheral electrodes or peripheral signal lines related to display driving. The peripheral electrode or the peripheral signal line may overlap the cathode electrode CE of the light emitting device ED of the display panel 110. For example, the peripheral electrode may include an anode electrode AE, and the like, and the peripheral signal line may include a data line DL, a gate line GL, and the like.

The cathode electrode CE of the light emitting device ED may be positioned under the encapsulation layer ENCAP. The peripheral electrode or the peripheral signal line may be disposed below or on the side of the cathode electrode CE. A parasitic capacitor Cp may be formed between the peripheral electrode and the cathode electrode CE or between the peripheral signal line and the cathode electrode CE.

Figure 11:
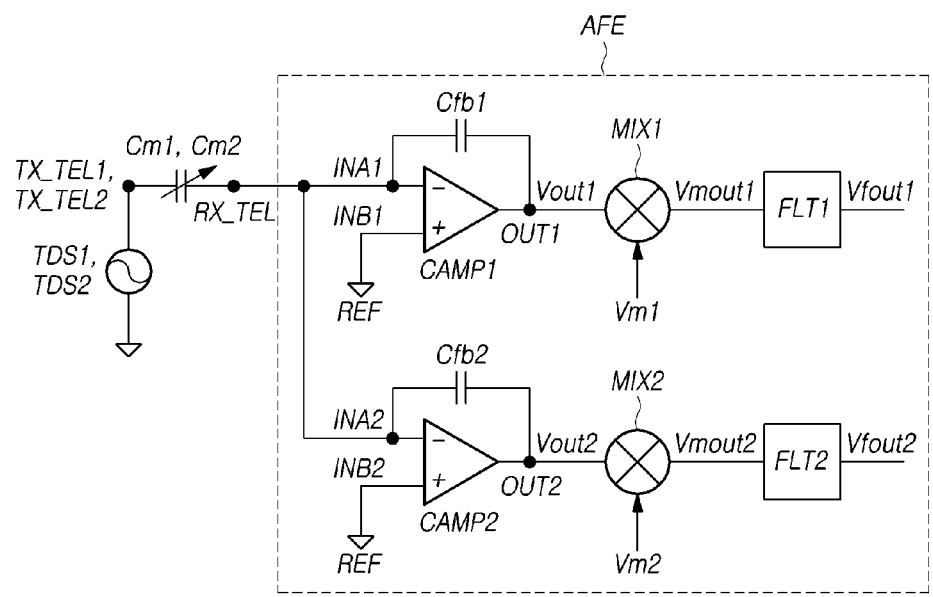
FIGS. 11 and 12 exemplarily illustrate an analog front end for the grouped touch sensor structure in the advanced touch sensing system of the touch display device according to embodiments of the present disclosure.
Figure 12:
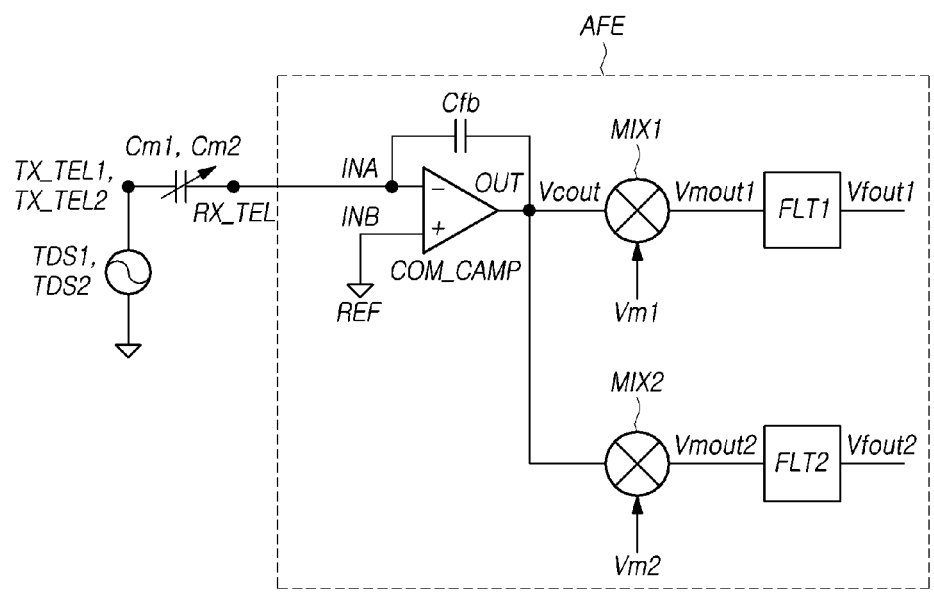

FIGS. 11 and 12 exemplarily illustrate an analog front end AFE for the grouped touch sensor structure in the advanced touch sensing system of the touch display device according to embodiments of the present disclosure.

Referring to FIGS. 11 and 12, each of the plurality of analog front ends AFE included in the receiving circuit 930 may include a first mixer MIX1, a second mixer MIX2, a first filter FLT1 and a second filter FLT2, etc.

Referring to FIGS. 11 and 12, the first mixer MIX1 may generate a first mixed output signal Vmout1 by mixing a signal Vout1 or Vcout detected through one of the plurality of third touch electrode lines RX_TEL and the first mixed signal Vm1, and may output the generated first mixed output signal Vmout1.

Referring to FIGS. 11 and 12, the first filter FLT1 may perform a first filtering process on the first mixed output signal Vmout1 that is the output signal of the first mixer MIX1 to output the first sensing signal Vfout1 having the first touch driving frequency f1.

Referring to FIGS. 11 and 12, the second mixer MIX2 may generate a second mixed output signal Vmout2 by mixing a signal Vout2 or Vcout detected through one of the plurality of third touch electrode lines RX_TEL and the second mixed signal Vm2, and may output the generated second mixed output signal Vmout2.

Referring to FIGS. 11 and 12, the second filter FLT2 may perform a second filtering process on the second mixed output signal Vmout2 that is the output signal of the second mixer MIX2 to output the second sensing signal Vfout2 having the second touch driving frequency f2.

Referring to FIGS. 11 and 12, the first mixed signal Vm1 may have the same frequency as the first touch driving frequency f1 of the first touch driving signal TDS1. The second mixed signal Vm2 may have the same frequency as the second touch driving frequency f2 of the second touch driving signal TDS2.

Referring to FIG. 11, each of the plurality of analog front ends AFE may further include a first charge amplifier CAMP1 and a second charge amplifier CAMP2 simultaneously connected to one of the plurality of third touch electrode lines RX_TEL.

Referring to FIG. 11, the first charge amplifier CAMP1 may be connected between one third touch electrode line RX_TEL and the first mixer MIX1. The second charge amplifier CAMP2 may be connected between one third touch electrode line RX_TEL and the second mixer MIX2.

The first charge amplifier CAMP1 may be an operational amplifier having a first input terminal INA1, a second input terminal INB1, and an output terminal OUT1. The first charge amplifier CAMP1 may include a first feedback capacitor Cfb1 connected between the first input terminal INA1 and the output terminal OUT1. The first input terminal INA1 of the first charge amplifier CAMP1 may be electrically connected to the corresponding third touch electrode line RX_TEL. A reference voltage REF may be applied to the second input terminal INB1 of the first charge amplifier CAMP1. The output signal Vout1 may be output to the output terminal OUT1 of the first charge amplifier CAMP1.

The second charge amplifier CAMP2 may be an operational amplifier having a first input terminal INA2, a second input terminal INB2, and an output terminal OUT2. The second charge amplifier CAMP2 may include a second feedback capacitor Cfb2 connected between the first input terminal INA2 and the output terminal OUT2. The first input terminal INA2 of the second charge amplifier CAMP2 may be electrically connected to the corresponding third touch electrode line RX_TEL. A reference voltage REF may be applied to the second input terminal INB2 of the second charge amplifier CAMP2. The output signal Vout2 may be output from the output terminal OUT2 of the second charge amplifier CAMP2.

Referring to FIG. 11, the first mixer MIX1 may mix the output signal Vout1 of the first charge amplifier CAMP1 and the first mixed signal Vm1 to output the first mixed output signal Vmout1. The second mixer MIX2 may mix the output signal Vout2 of the second charge amplifier CAMP2 and the second mixed signal Vm2 to output the second mixed output signal Vmout2.

Referring to FIGS. 11 and 9, when the first touch driving signal TDS1 having the first touch driving frequency f1 is applied to the first touch electrode line TX_TEL1 in the first area A1, and the second touch driving signal TDS2 having the second touch driving frequency f2 is applied to the second touch electrode line TX_TEL2 of the second area A2, two mutual-capacitances Cm1 and Cm2 may be formed in the third touch electrode line RX_TEL electrically commonly connected to the first input terminal INA1 of the first charge amplifier CAMP1 and the first input terminal INA2 of the second charge amplifier CAMP2.

Referring to FIGS. 11 and 9, the two mutual-capacitances Cm1 and Cm2 formed in the third touch electrode line RX_TEL may include a first mutual-capacitance Cm1 formed between the third touch electrode line RX_TEL and the first touch electrode line TX_TEL1 in the first area A1, and a second mutual-capacitance Cm2 formed between the third touch electrode line RX_TEL and the second touch electrode line TX_TEL2 in the second area A2, Accordingly, the amount of charge charged in the first feedback capacitor Cfb1 of the first charge amplifier CAMP1 and the second feedback capacitor Cfb2 of the second charge amplifier CAMP2 may vary according to the summed capacitance of the two mutual-capacitances Cm1 and Cm2 formed in the third touch electrode line RX_TEL.

Referring to FIG. 11, the output signal Vout1 of the first charge amplifier CAMP1 may correspond to the summed capacitance of the two mutual-capacitances Cm1 and Cm2. However, after the output signal Vout1 of the first charge amplifier CAMP1 passes through the first mixer MIX1 and the first filter FLT1, the first sensing signal Vfout1 output from the first filter FLT1 may have only a signal component corresponding to the first mutual-capacitance Cm1 formed between the third touch electrode line RX_TEL and the first touch electrode line TX_TEL1 of the first area A1. Accordingly, the presence or absence of a touch or touch coordinates in the first area A1 may be sensed based on the first sensing signal Vfout1.

Also, the output signal Vout2 of the second charge amplifier CAMP2 may correspond to the summed capacitance of the two mutual-capacitances Cm1 and Cm2. However, after the output signal Vout2 of the second charge amplifier CAMP2 passes through the second mixer MIX2 and the second filter FLT2, the second sensing signal Vfout2 output from the second filter FLT2 may have only a signal component corresponding to the second mutual-capacitance Cm2 formed between the third touch electrode line RX_TEL and the second touch electrode line TX_TEL2 of the second area A2. Accordingly, the presence or absence of a touch or touch coordinates in the second area A2 may be sensed based on the second sensing signal Vfout2.

Referring to FIG. 11, the analog front end AFE included in the receiving circuit 930 of the touch driving circuit 210 may further include a first integrator and a second integrator.

The touch driving circuit 210 may further include one or more of first to third multiplexer circuits and an analog-to-digital converter.

The first integrator may integrate the output signal Vfout1 of the first filter FLT1 to output a first integral value. The second integrator may integrate the output signal Vfout2 of the second filter FLT2 to output a second integral value.

The analog-to-digital converter may generate a touch sensing value by converting each of the first integral value and the second integral value into a digital value. Touch sensing values generated by the analog-to-digital converter may be touch sensing data. The first multiplexer circuit may select one of the plurality of first touch electrode lines TX_TEL1 and connect the selected first touch electrode line TX_TEL1 to the first signal output circuit 911 of the first transmitting circuit 910. The second multiplexer circuit may select one of the plurality of second touch electrode lines TX_TEL2 and connect the selected second touch electrode line TX_TEL2 to the second signal output circuit 921 of the second transmitting circuit 920. The second multiplexer circuit may select one of the plurality of third touch electrode lines RX_TEL and connect the selected third touch electrode line RX_TEL to the first charge amplifier CAMP1 and the second charge amplifier CAMP2.

Referring to FIG. 12, each of the plurality of analog front ends AFE may further include one common charge amplifier COM_CAMP connected to one third touch electrode line RX_TEL among the plurality of third touch electrode lines RX_TEL.

The common charge amplifier COM_CAMP may be an operational amplifier having a first input terminal INA, a second input terminal INB, and an output terminal OUT. The common charge amplifier COM_CAMP may include a feedback capacitor Cfb connected between the first input terminal INA and the output terminal OUT.

Referring to FIG. 12, the first mixer MIX1 may mix the output signal Vcout of the common charge amplifier COM_CAMP and the first mixed signal Vm1 to output the first mixed output signal Vmout1. The second mixer MIX2 may mix the output signal Vcout of the common charge amplifier COM_CAMP and the second mixed signal Vm2 to output the second mixed output signal Vmout2.

Referring to FIGS. 12 and 9, when the first touch driving signal TDS1 having the first touch driving frequency f1 is applied to the first touch electrode line TX_TEL1 of the first area A1, and the second touch driving signal TDS2 having the second touch driving frequency f2 is applied to the second touch electrode line TX_TEL2 of the second area A2, two mutual-capacitances Cm1 and Cm2 may be formed in the third touch electrode line RX_TEL electrically connected to the first input terminal INA of the common charge amplifier COM_CAMP.

Referring to FIGS. 12 and 9, two mutual-capacitances Cm1 and Cm2 formed in the third touch electrode line RX_TEL may include a first mutual-capacitance Cm1 formed between the third touch electrode line RX_TEL and the first touch electrode line TX_TEL1 in the first area A1, and a second mutual-capacitance Cm2 formed between the third touch electrode line RX_TEL and the second touch electrode line TX_TEL2 in the second area A2.

Accordingly, the amount of charge charged in the feedback capacitor Cfb of the common charge amplifier COM_CAMP may vary according to the summed capacitance of the two mutual-capacitances Cm1 and Cm2 formed in the third touch electrode line RX_TEL.

Referring to FIG. 12, the output signal Vcout of the common charge amplifier COM_CAMP may correspond to the summed capacitance of two mutual-capacitances Cm1 and Cm2. However, after the output signal Vcout of the common charge amplifier COM_CAMP passes through the first mixer MIX1 and the first filter FLT1, the first sensing signal Vfout1 output from the first filter FLT1 may have only a signal component corresponding to the first mutual-capacitance Cm1 formed between the third touch electrode line RX_TEL and the first touch electrode line TX_TEL1 of the first area A1. Accordingly, the presence or absence of a touch or touch coordinates in the first area A1 may be sensed based on the first sensing signal Vfout1.

Also, the output signal Vcout of the common charge amplifier COM_CAMP may correspond to the summed capacitance of the two mutual-capacitances Cm1 and Cm2. However, after the output signal Vcout of the common charge amplifier COM_CAMP passes through the second mixer MIX2 and the second filter FLT2, the second sensing signal Vfout2 output from the second filter FLT2 may have only a signal component corresponding to the second mutual-capacitance Cm2 formed between the third touch electrode line RX_TEL and the second touch electrode line TX_TEL2 of the second area A2. Accordingly, the presence or absence of a touch or touch coordinates in the second area A2 may be sensed based on the second sensing signal Vfout2.

FIGS. 13 to 16 illustrate a first filter FLT1 and a second filter FLT2 included in the analog front end AFE for the grouped touch sensor structure in the advanced touch sensing system of the touch display device according to embodiments of the present disclosure.

Referring to FIGS. 13 to 16, when the second touch driving frequency f2 is higher than the first touch driving frequency f1, the first filter FLT1 may be a low pass filter LPF or a band pass filter BPF.

Figure 13:
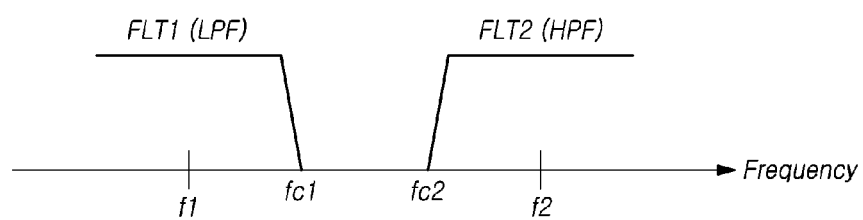
FIGS. 13 to 16 illustrate a first filter and a second filter included in the analog front end for the grouped touch sensor structure in the advanced touch sensing system of the touch display device according to embodiments of the present disclosure.
Figure 14:
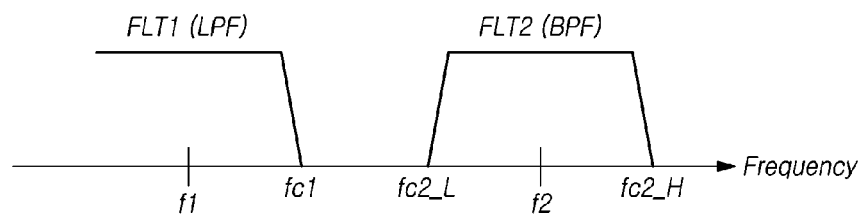

Referring to FIGS. 13 and 14, when the first filter FLT1 is a low-pass filter LPF, the first filter FLT1 may output a signal having a frequency equal to or less than a first cutoff frequency fc1 from the first mixed output signal Vmout1, which is an output signal of the first mixer MIX1, as a first sensing signal Vfout1.

In the first filter FLT1, the first cutoff frequency fc1 may be higher than the first touch driving frequency f1 and lower than the second touch driving frequency f2.

Figure 15:
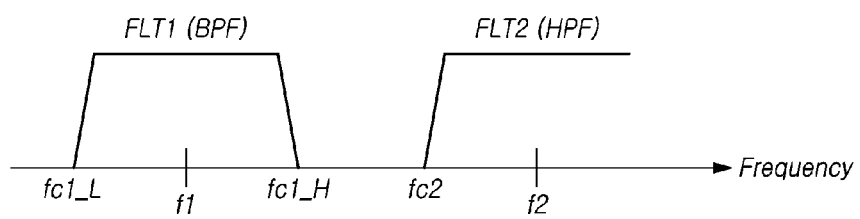
Figure 16:
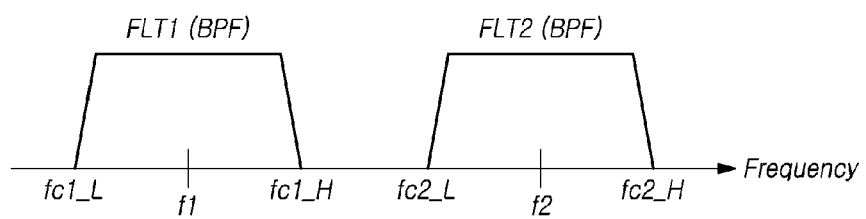

Referring to FIGS. 15 and 16, when the first filter FLT1 is a band-pass filter BPF, the first filter FLT1 may output a signal having a frequency between a first low cutoff frequency fc1_L and a first high cutoff frequency fc1_H in a first mixed output signal Vmout1 that is an output signal of the first mixer MIX1 as a first sensing signal Vfout1.

In the first filter FLT1, the first high cutoff frequency fc1_H may be higher than the first touch driving frequency f1 and lower than the second touch driving frequency f2. The first low cut-off frequency fc1_L may be lower than the first touch driving frequency f1.

Referring to FIGS. 13 to 16, when the second touch driving frequency f2 is higher than the first touch driving frequency f1, the second filter FLT2 may be a high pass filter HPF or a band pass filter BPF.

Referring to FIGS. 13 and 15, when the second filter FLT2 is a high pass filter HPF, the second filter FLT2 may output a signal having a frequency greater than or equal to the second cutoff frequency fc2 in the second mixed output signal Vmout2 that is the output signal of the second mixer MIX2 as the second sensing signal Vfout2.

In the second filter FLT2, the second cutoff frequency fc2 may be higher than the first touch driving frequency f1 and lower than the second touch driving frequency f2.

Referring to FIGS. 14 and 16, when the second filter FLT2 is a band pass filter BPF, the second filter FLT2 may output a signal having a frequency between the second low cutoff frequency fc2_L and the second high cutoff frequency fc2_H in the second mixed output signal Vmout2 that is the output signal of the second mixer MIX2 as the second sensing signal Vfout2.

In the second filter FLT2, the second high cutoff frequency fc2_H may be higher than the second touch driving frequency f2. The second low cut-off frequency fc2_L may be higher than the first touch driving frequency f1 and lower than the second touch driving frequency f2.

Figure 17:
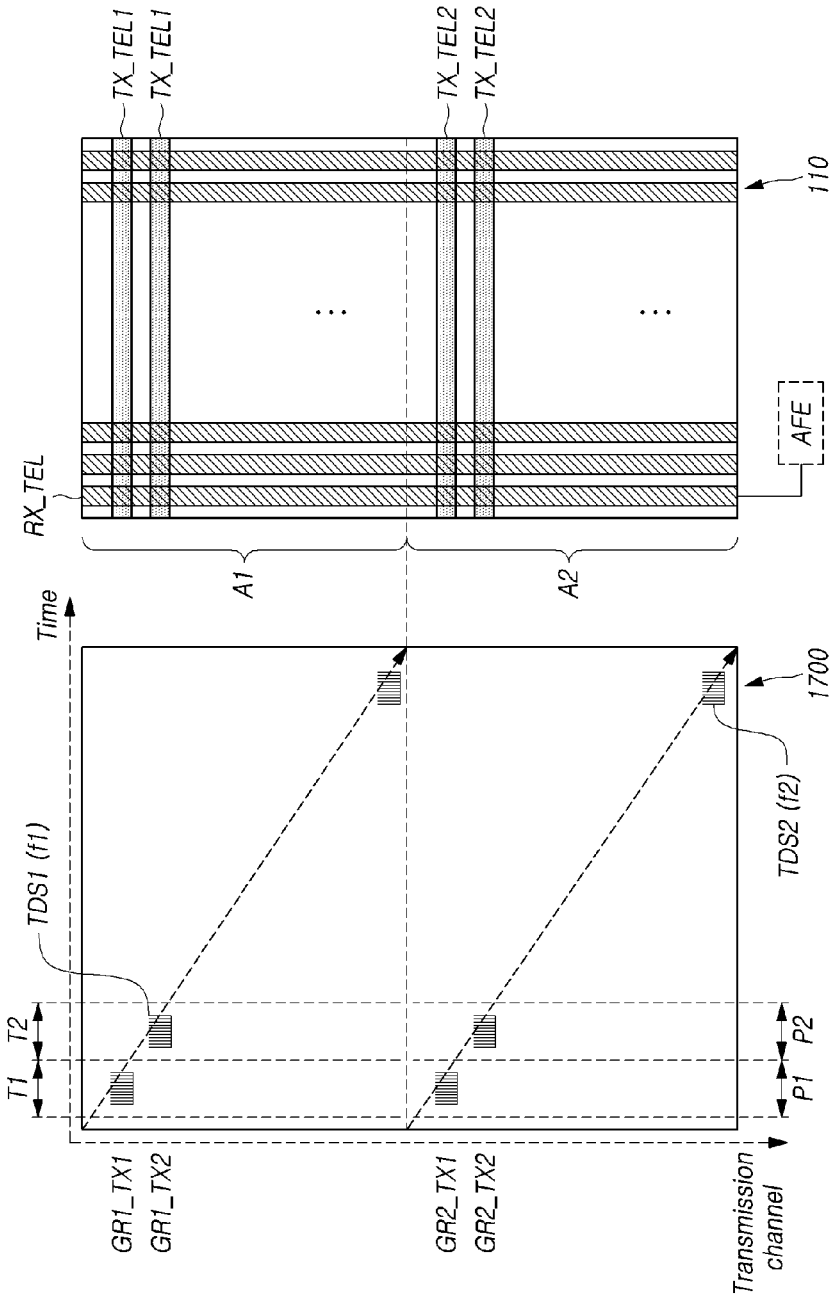
FIG. 17 is a diagram illustrating a first driving method for the grouped touch sensor structure in the advanced touch sensing system of the touch display device according to embodiments of the present disclosure.
Figure 18:
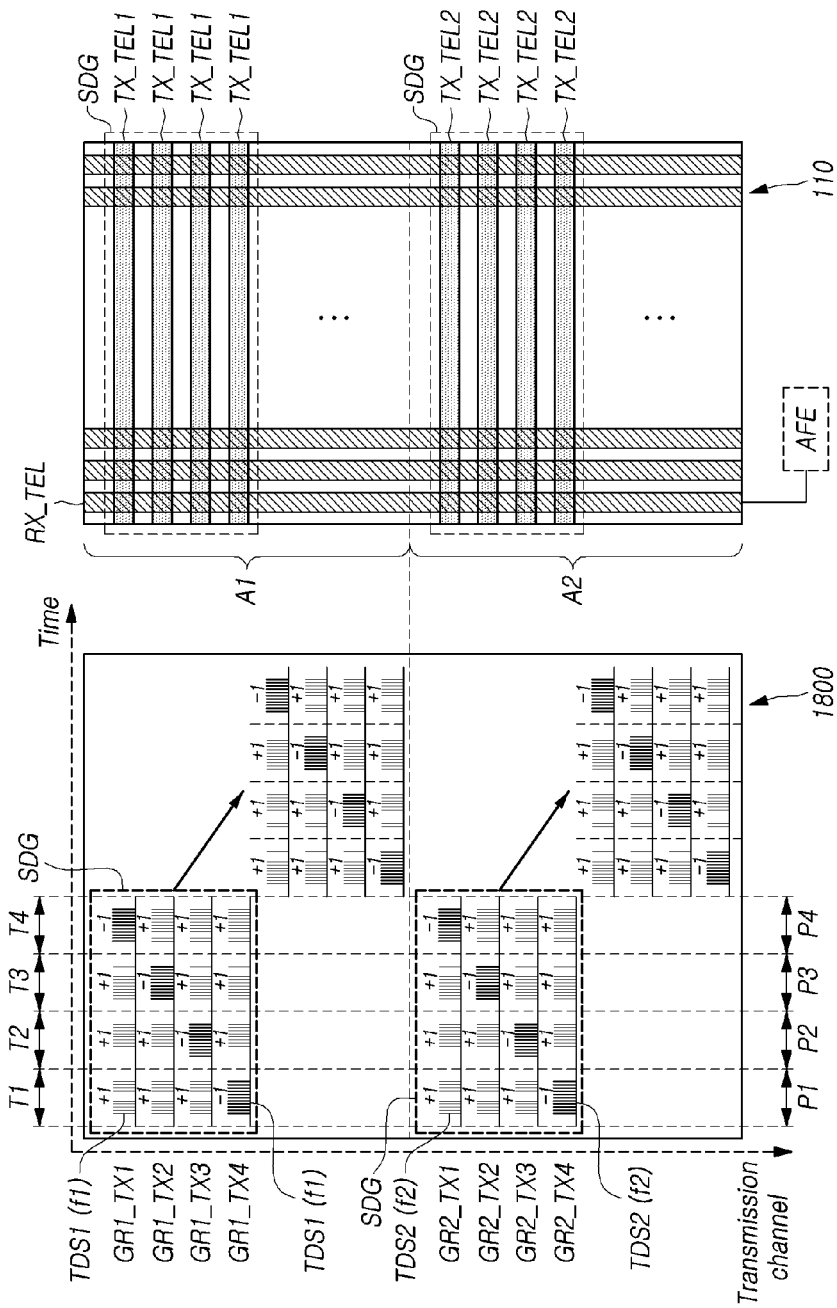
FIG. 18 is a diagram illustrating a second driving method for the grouped touch sensor structure in the advanced touch sensing system of the touch display device according to embodiments of the present disclosure.

FIGS. 17 and 18 are diagrams illustrating a driving method for the grouped touch sensor structure in the advanced touch sensing system of the touch display device according to embodiments of the present disclosure.

FIG. 17 is a diagram 1700 illustrating the grouped touch sensor structure included in the display panel 110 and a first driving method of the grouped touch sensor structure. FIG. 18 is a diagram 1800 illustrating the grouped touch sensor structure included in the display panel 110 and a second driving method of the grouped touch sensor structure.

Referring to FIGS. 17 and 18, in diagrams 1700 and 1800, the Y axis is a transmission channel, and the X axis is time (driving period).

Referring to the diagrams 1700 and 1800 of FIGS. 17 and 18, the plurality of first touch electrode lines TX_TEL1 disposed in the first area A1 may respectively correspond to the plurality of first group transmission channels GR1_TX1, GR1_TX2, GR1_TX3, GR1_TX4, and the like. The plurality of second touch electrode lines TX_TEL2 disposed in the second area A2 may respectively correspond to the plurality of second group transmission channels GR2_TX1, GR2_TX2, GR2_TX3, GR2_TX4, and the like. The driving period for driving the touch sensor may include a first area driving period and a second area driving period.

Referring to FIGS. 17 and 18, the first touch sensor group disposed in the first area A1 and the second touch sensor group disposed in the second area A2 may be simultaneously driven.

Accordingly, referring to FIGS. 17 and 18, the first area driving period and the second area driving period may overlap in time. The first area driving period may be driving periods (T1, T2, T3, T4, etc.) in which the first touch driving signal TDS1 is supplied to at least one of the plurality of first touch electrode lines TX_TEL1 disposed in the first area A1. The second area driving period may be driving periods (P1, P2, P3, P4, etc.) in which the second touch driving signal TDS2 is supplied to at least one of the plurality of second touch electrode lines TX_TEL2 disposed in the second area A2.

Referring to FIGS. 17 and 18, the first touch sensor group disposed in the first area A1 and the second touch sensor group disposed in the second area A2 may be driven in different time zones. For example, the first touch sensor group disposed in the first area A1 may be driven first, and then the second touch sensor group disposed in the second area A2 may be driven.

Accordingly, referring to FIGS. 17 and 18, the first area driving periods and the second area driving periods may be separated in time. The first area driving period may be driving periods (T1, T2, T3, T4, etc.) in which the first touch driving signal TDS1 is supplied to at least one of the plurality of first touch electrode lines TX_TEL1 disposed in the first area A1. The second area driving period may be driving periods (P1, P2, P3, P4, etc.) in which the second touch driving signal TDS2 is supplied to at least one of the plurality of second touch electrode lines TX_TEL2 disposed in the second area A2.

Referring to FIG. 17, the first transmitting circuit 910 of the touch driving circuit 210 may sequentially drive the plurality of first touch electrode lines TX_TEL1 one by one using the first touch driving signal TDS1. The second transmitting circuit 920 of the touch driving circuit 210 may sequentially drive the plurality of second touch electrode lines TX_TEL2 one by one using the second touch driving signal TDS2.

Even if the driving time is changed or the supply position of the first touch driving signal TDS1 is changed, the phase of the first touch driving signal TDS1 may not be changed and may be maintained constant.

The first touch driving signal TDS1 supplied to each of the plurality of first touch electrode lines TX_TEL1 may have the same phase.

In the driving periods (T1, T2) for the first area A1, in the first touch driving signal TDS1 in the first driving period T1 and the first touch driving signal TDS1 in the second driving period T2 may have the same phase as each other.

Even if the driving time is changed or the supply position of the second touch driving signal TDS2 is changed, the phase of the second touch driving signal TDS2 may not be changed and may be maintained constant.

The second touch driving signal TDS2 supplied to each of the plurality of second touch electrode lines TX_TEL2 may have the same phase.

In the driving periods (P1, P2) for the second area A2, the second touch driving signal TDS2 in the first driving period P1 and the second touch driving signal TDS2 in the second driving period P2 may have the same phase.

Referring to FIG. 18, in each of the n first area driving periods (T1, T2, T3, T4, etc.), the first transmitting circuit 910 of the touch driving circuit 210 may simultaneously and repeatedly supply n first touch driving signals TDS1 to n first touch electrode lines TX_TEL1 among the plurality of first touch electrode lines TX_TEL1, where n may be a natural number of 2 or more.

The n first touch electrode lines TX_TEL1 may correspond to the n first group transmission channels GR1_TX1, GR1_TX2, GR1_TX3, GR1_TX4, and the like.

In each of the n first area driving periods (T1, T2, T3, T4, etc.), at least one of the n first touch driving signals TX_TEL1 may have a different phase from the rest. In each of the n first area driving periods (T1, T2, T3, T4, etc.), some of the n first touch driving signals TX_TEL1 may have a positive phase (+1) and others may have an inverse phase (−1). In each of the n first area driving periods (T1, T2, T3, T4, etc.), the position of the first touch electrode line TX_TEL1 to which the first touch driving signal TDS1 having an inverse phase (−1) among the n first touch driving signals TX_TEL1 is applied may be constant or may be changed.

Referring to the example of FIG. 18, four first group transmission channels GR1_TX1, GR1_TX2, GR1_TX3, and GR1_TX4 corresponding to the four first touch electrode lines TX_TEL1 may be one simultaneous driving group SDG.

Referring to the example of FIG. 18, in each of the four first area driving periods T1, T2, T3, and T4, four first touch driving signals TDS1 may be simultaneously and repeatedly supplied to four first touch electrode lines TX_TEL1. The four first touch electrode lines TX_TEL1 may correspond to the four first group transmission channels GR1_TX1, GR1_TX2, GR1_TX3, and GR1_TX4. In each of the four first area driving periods T1, T2, T3, and T4, among the four first touch driving signals TX_TEL1, the three first touch driving signals TDS1 may have a positive phase (+1), and the remaining first touch driving signal TDS1 may have an inverse phase (−1).

Referring to FIG. 18, in each of the n second area driving periods (P1, P2, P3, P4, etc.), the second transmitting circuit 920 of the touch driving circuit 210 may simultaneously and repeatedly supply n second touch driving signals TDS2 to n second touch electrode lines TX_TEL2 among the plurality of second touch electrode lines TX_TEL2.

The n second touch electrode lines TX_TEL2 may correspond to the n second group transmission channels GR2_TX1, GR2_TX2, GR2_TX3, GR2_TX4, and the like.

In each of the n second area driving periods (P1, P2, P3, P4, etc.), at least one of the n second touch driving signals TX_TEL2 may have a different phase from the rest. In each of the n second area driving periods (P1, P2, P3, P4, etc.), some of the n second touch driving signals TX_TEL2 may have a positive phase (+1) and others may have an inverse phase (−1). In each of the n second area driving periods (P1, P2, P3, P4, etc.), the second touch electrode line TX_TEL2 to which the second touch driving signal TDS2 having an inverse phase (−1) among the n second touch driving signals TX_TEL2 is applied. The position of may be constant or may change.

Referring to the example of FIG. 18, four second group transmission channels GR2_TX1, GR2_TX2, GR2_TX3, and GR2_TX4 corresponding to the four second touch electrode lines TX_TEL2 may be one simultaneous driving group SDG.

Referring to the example of FIG. 18, in each of the four second area driving periods P1, P2, P3, and P4, four second touch driving signals TDS2 may be simultaneously and repeatedly supplied to four second touch electrode lines TX_TEL2. The four second touch electrode lines TX_TEL2 may correspond to the four second group transmission channels GR2_TX1, GR2_TX2, GR2_TX3, and GR2_TX4. In each of the four second area driving periods P1, P2, P3, and P4, three second touch driving signals TDS2 among the four second touch driving signals TX_TEL2 may have a positive phase (+1), and the remaining one second touch driving signal TDS2 may have an inverse phase (−1).

The driving method described with reference to FIG. 17 may be referred to as a first driving method, and the driving method described with reference to FIG. 18 may be referred to as a second driving method. Compared to the first driving method, the second driving method does not change the touch sensing time, but can increase the signal-to-noise ratio, thereby improving the touch sensitivity.

Figure 19:
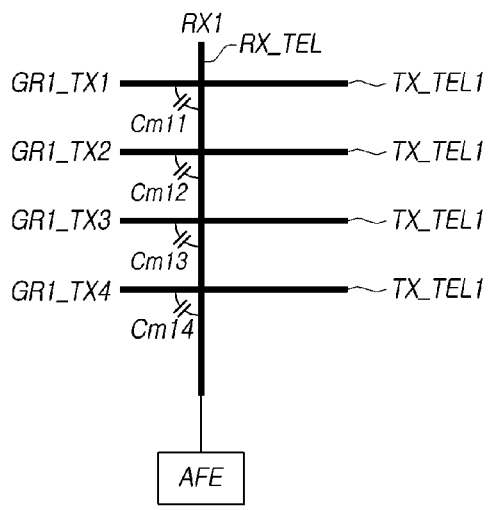
FIG. 19 illustrates a touch sensing principle according to the second driving method of FIG. 18 according to embodiments of the present disclosure.

FIG. 19 illustrates a touch sensing principle according to the second driving method of FIG. 18 according to one embodiment.

Referring to FIG. 19, in order to explain the touch sensing principle, four first touch electrode lines TX_TEL1 corresponding to four first group transmission channels GR1_TX1, GR1_TX2, GR1_TX3, and GR1_TX4 in the first area A1 and one third touch electrode line RX_TEL corresponding to the first reception channel RX1 are exemplified.

Each of the four first touch electrode lines TX_TEL1 corresponding to the four first group transmission channels GR1_TX1, GR1_TX2, GR1_TX3, and GR1_TX4 may form a mutual-capacitance Cm11, Cm12, Cm13, and Cm14 with one third touch electrode line RX_TEL. That is, one third touch electrode line RX_TEL may form four mutual-capacitances Cm11, Cm12, Cm13, and Cm14 with four first touch electrode lines TX_TEL1.

In each of the four first area driving periods T1, T2, T3, and T4, a mutual-capacitance Cm11 may be formed between the first touch electrode line TX_TEL1 corresponding to GR1_TX1 and the third touch electrode line RX_TEL corresponding to RX1.

In each of the four first area driving periods T1, T2, T3, and T4, a mutual-capacitance Cm12 may be formed between the first touch electrode line TX_TEL1 corresponding to GR1_TX2 and the third touch electrode line RX_TEL corresponding to RX1.

In each of the four first area driving periods T1, T2, T3, and T4, a mutual-capacitance Cm13 may be formed between the first touch electrode line TX_TEL1 corresponding to GR1_TX3 and the third touch electrode line RX_TEL corresponding to RX1.

In each of the four first area driving periods T1, T2, T3, and T4, a mutual-capacitance Cm14 may be formed between the first touch electrode line TX_TEL1 corresponding to GR1_TX4 and the third touch electrode line RX_TEL corresponding to RX1.

During period T1 of the first area driving periods T1, T2, T3, and T4, charges corresponding to four mutual-capacitances Cm11, Cm12, Cm13, and Cm14 between the four first touch electrode lines TX_TEL1 and one third touch electrode line RX_TEL may be charged in the analog front end AFE, and a sensing value corresponding to the charged amount Q(T1) of electric charge may be obtained.

During period T2 of the first area driving periods T1, T2, T3, and T4, charges corresponding to four mutual-capacitances Cm11, Cm12, Cm13, and Cm14 between the four first touch electrode lines TX_TEL1 and one third touch electrode line RX_TEL may be charged in the analog front end AFE, and a sensing value corresponding to the charged amount Q(T2) of electric charge may be obtained.

During period T3 of the first area driving periods T1, T2, T3, and T4, charges corresponding to four mutual-capacitances Cm11, Cm12, Cm13, and Cm14 between the four first touch electrode lines TX_TEL1 and one third touch electrode line RX_TEL may be charged in the analog front end AFE, and a sensing value corresponding to the charged amount Q(T3) of electric charge may be obtained.

During period T4 of the first area driving periods T1, T2, T3, and T4, charges corresponding to four mutual-capacitances Cm11, Cm12, Cm13, and Cm14 between the four first touch electrode lines TX_TEL1 and one third touch electrode line RX_TEL may be charged in the analog front end AFE, and a sensing value corresponding to the charged amount Q(T4) of electric charge may be obtained.

During T1 of the four first area driving periods T1, T2, T3, and T4, the first touch driving signal TDS1 supplied to the first touch electrode line TX_TEL1 corresponding to GR1_TX1 may be referred to as Vtx1, T1, the first touch driving signal TDS1 supplied to the first touch electrode line TX_TEL1 corresponding to GR1_TX2 may be referred to as Vtx2,T1, the first touch driving signal TDS1 supplied to the first touch electrode line TX_TEL1 corresponding to GR1_TX3 may be referred to as Vtx3,T1, and the first touch driving signal TDS1 supplied to the first touch electrode line TX_TEL1 corresponding to GR1_TX4 is referred to as Vtx4,T1.

During T2 of the four first area driving periods T1, T2, T3, and T4, the first touch driving signal TDS1 supplied to the first touch electrode line TX_TEL1 corresponding to GR1_TX1 may be referred to as Vtx1, T2, the first touch driving signal TDS1 supplied to the first touch electrode line TX_TEL1 corresponding to GR1_TX2 may be referred to as Vtx2,T2, the first touch driving signal TDS1 supplied to the first touch electrode line TX_TEL1 corresponding to GR1_TX3 may be referred to as Vtx3,T2, and the first touch driving signal TDS1 supplied to the first touch electrode line TX_TEL1 corresponding to GR1_TX4 is referred to as Vtx4,T2.

During T3 of the four first area driving periods T1, T2, T3, and T4, the first touch driving signal TDS1 supplied to the first touch electrode line TX_TEL1 corresponding to GR1_TX1 may be referred to as Vtx1, T3, the first touch driving signal TDS1 supplied to the first touch electrode line TX_TEL1 corresponding to GR1_TX2 may be referred to as Vtx2,T3, the first touch driving signal TDS1 supplied to the first touch electrode line TX_TEL1 corresponding to GR1_TX3 may be referred to as Vtx3,T3, and the first touch driving signal TDS1 supplied to the first touch electrode line TX_TEL1 corresponding to GR1_TX4 is referred to as Vtx4,T3.

During T4 of the four first area driving periods T1, T2, T3, and T4, the first touch driving signal TDS1 supplied to the first touch electrode line TX_TEL1 corresponding to GR1_TX1 may be referred to as Vtx1, T4, the first touch driving signal TDS1 supplied to the first touch electrode line TX_TEL1 corresponding to GR1_TX2 may be referred to as Vtx2,T4, the first touch driving signal TDS1 supplied to the first touch electrode line TX_TEL1 corresponding to GR1_TX3 may be referred to as Vtx3,T4, and the first touch driving signal TDS1 supplied to the first touch electrode line TX_TEL1 corresponding to GR1_TX4 is referred to as Vtx4,T4.

The electric charge amount Q(T1), Q(T2), Q(T3), and Q(T4) in each of the four first area driving periods T1, T2, T3, and T4 may be represented by a matrix A having four rows and one column Here, the electric charge amounts Q(T1), Q(T2), Q(T3), and Q(T4), which are elements of the matrix A, are sensed values (measured values), and thus are information that can be known through sensing.

In each of the four first area driving periods T1, T2, T3, and T4, the first touch driving signals TDS1 supplied to the four first touch electrode lines TX_TEL1 may be represented by a matrix B having 4 rows and 4 columns. Here, the elements of the matrix B may be predetermined values for touch driving.

In each of the four first area driving periods T1, T2, T3, and T4, the mutual-capacitances Cm11, Cm12, Cm13, and Cm14 formed by the four first touch electrode lines TX_TEL1 corresponding to the four first group transmission channels GR1_TX1, GR1_TX2, GR1_TX3, and GR1_TX4 and one third touch electrode line RX_TEL may be represented by a matrix C with four rows and one column Elements of matrix C may be values that need to be found to detect touch presence or touch coordinates. That is, values of elements of the matrix C are determined, so that the presence or absence of a touch or touch coordinates can be detected.

Since the amount of charge is the product of voltage and capacitance, matrix A may be equal to the matrix product of matrix B and matrix C. A matrix C can be obtained through the matrix multiplication of the inverse of the matrix B and the matrix A.

The touch controller 220 may calculate four mutual-capacitances Cm11, Cm12, Cm13, and Cm14 in the first area A1 by using the first sensing result obtained through the analog front-end AFE for the first reception channel RX1. The first sensing result may correspond to the output signal of the first filter FLT1.

The four mutual-capacitances Cm11, Cm12, Cm13, and Cm14 in the first area A1 are capacitances formed between the third touch electrode line RX_TEL corresponding to the first reception channel RX1 and the four first touch electrode lines TX_TEL1 disposed in the first area A1. Here, the four first touch electrode lines TX_TEL1 may correspond to four first group transmission channels GR1_TX1, GR1_TX2, GR1_TX3, and GR1_TX4.

In the same manner, the touch controller 220 may calculate four mutual-capacitances Cm11, Cm12, Cm13, and Cm14 in the second area A2 by using the second sensing result obtained through the analog front end AFE for the first reception channel RX1. The second sensing result may correspond to the output signal of the second filter FLT2.

The four mutual-capacitances in the second area A2 are capacitances formed between the third touch electrode line RX_TEL corresponding to the first reception channel RX1 and the four second touch electrode lines TX_TEL2 disposed in the second area A2. Here, the four second touch electrode lines TX_TEL2 may correspond to four second group transmission channels GR2_TX1, GR2_TX2, GR2_TX3, and GR2_TX4.

According to the above-described method, the touch controller 220 may calculate mutual-capacitances for all reception channels, and calculate touch coordinates by synthesizing the calculated results.

The touch controller 220 may calculate all mutual-capacitances or values corresponding thereto for each of the plurality of third touch electrode lines RX_TEL, and calculate touch coordinates using the calculated result.

Figure 20:
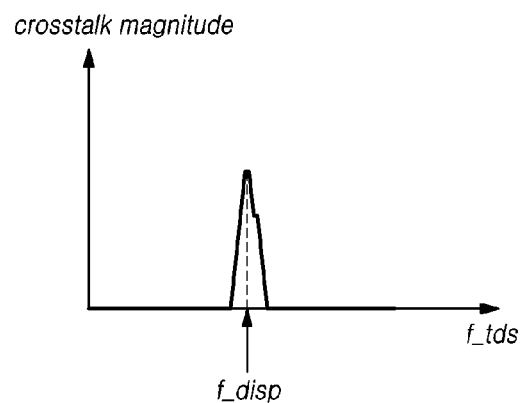
FIG. 20 is a graph showing experimental results obtained by measuring a crosstalk phenomenon according to a change in a touch driving frequency with respect to an advanced touch sensing system of a touch display device according to embodiments of the present disclosure. In this experiment, the touch driving frequency avoidance design for the grouped touch sensor structure is applied to the advanced touch sensing system of the touch display device according to embodiments of the present disclosure.

FIG. 20 is a graph showing experimental results obtained by measuring a crosstalk phenomenon according to a change in a touch driving frequency f_tds with respect to an advanced touch sensing system of a touch display device according to embodiments of the present disclosure. In this experiment, the touch driving frequency avoidance design for the grouped touch sensor structure is applied to the advanced touch sensing system of the touch display device according to embodiments of the present disclosure.

In the graph shown in FIG. 20, the x-axis is the touch driving frequency f_tds, and the y-axis is the crosstalk magnitude. The graph of FIG. 20 is a graph showing the result of measuring the magnitude of crosstalk generated by the touch sensor while the display driving frequency f_disp is fixed and the touch driving frequency f_tds is changed. The crosstalk magnitude may be a value obtained from an output signal output from the analog front end AFE or a value obtained from a value obtained by converting an output signal output from the analog front end AFE into a digital value.

According to the experimental measurement result graph of FIG. 20, as the touch driving frequency f_tds is set closer to the display driving frequency f_disp, it can be seen that the crosstalk magnitude increases. It can be seen that as the touch driving frequency f_tds has a large difference from the display driving frequency f_disp, the crosstalk size decreases.

Accordingly, according to embodiments of the present disclosure, as the touch driving frequency f_tds is set to be avoided with the display driving frequency f_disp, the crosstalk magnitude may be reduced. Accordingly, touch sensitivity may be improved.

Figure 21:
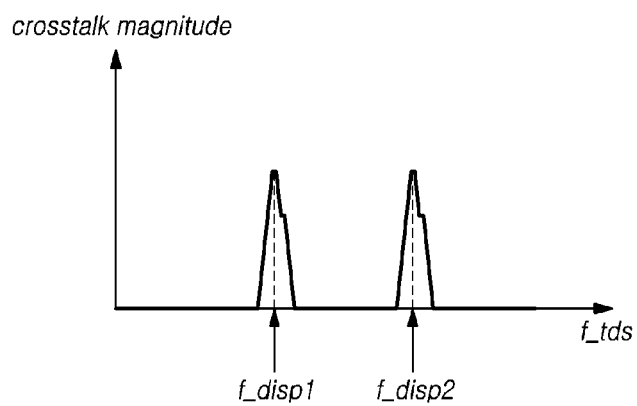
FIG. 21 is a graph showing experimental results obtained by measuring a crosstalk phenomenon according to a change in a touch driving frequency when the touch display device according to embodiments of the present disclosure uses two display driving frequencies. In this experiment, the touch driving frequency avoidance design for the grouped touch sensor structure is applied to the touch display device according to the embodiments of the present disclosure.

FIG. 21 is a graph showing experimental results obtained by measuring a crosstalk phenomenon according to a change in a touch driving frequency when the touch display device according to embodiments of the present disclosure uses two display driving frequencies. In this experiment, the touch driving frequency avoidance design for the grouped touch sensor structure is applied to the touch display device according to the embodiments of the present disclosure.

The touch display device according to embodiments of the present disclosure may perform display driving while changing two display driving frequencies (e.g., 60 Hz, 90 Hz). For example, in a first driving situation or a first driving timing, the touch display device may perform display driving at a first display frame frequency (e.g., 60 Hz) among two display driving frequencies. Also, in the second driving situation or the second driving timing, the touch display device may perform display driving at a second display frame frequency (e.g., 90 Hz) among two display driving frequencies.

As such, when two display driving frequencies are used, the display driving control signal DDCS used in the touch display device may include a first display driving control signal DDCS having a first display driving frequency f_disp1, and a second display driving control signal DDCS having a second display driving frequency f_disp2.

For example, when display driving is performed at the first display frame frequency (e.g., 60 Hz), the horizontal synchronization signal HSYNC may have the first touch driving frequency. When display driving is performed at the second display frame frequency (e.g., 90 Hz), the horizontal synchronization signal HSYNC may have the second touch driving frequency.

FIG. 21 is a graph of experimental results obtained by measuring a crosstalk phenomenon according to a change in a touch driving frequency in consideration of a situation in which two display driving frequencies are used.

According to the experimental measurement result graph of FIG. 21, when the touch driving frequency f_tds is set close to the first display driving frequency f_disp1 or close to the second display driving frequency f_disp2, it can be seen that the crosstalk magnitude increases.

It can be seen that as the touch driving frequency f_tds has a large difference from both the first display driving frequency f_disp1 and the second display driving frequency f_disp2, the crosstalk magnitude decreases.

Therefore, according to embodiments of the present disclosure, even in a situation where two display driving frequencies are used, as the touch driving frequency f_tds is set to avoid the two display driving frequencies f_disp1 and f_disp2, the crosstalk magnitude may be reduced. Accordingly, touch sensitivity may be improved.

Figure 22:
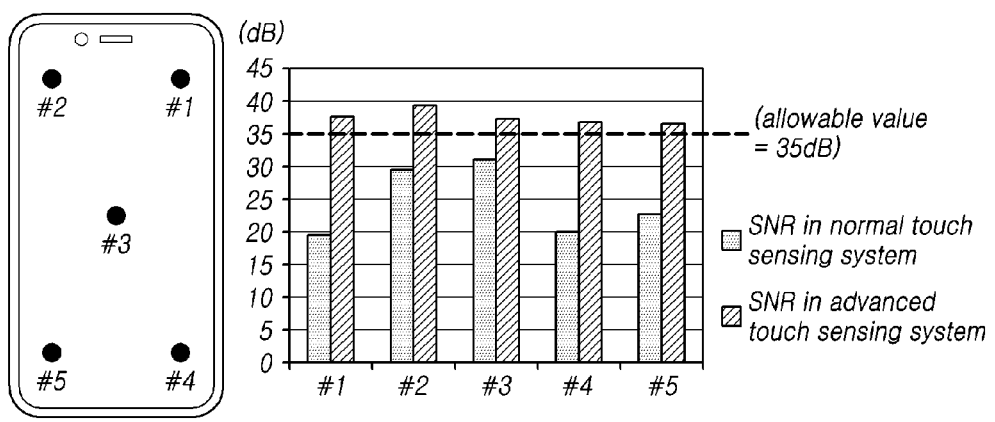
FIG. 22 illustrates experimental results of measuring the signal-to-noise ratio before and after applying the advanced touch sensing system to the touch display device according to embodiments of the present disclosure.

FIG. 22 illustrates experimental results of measuring the signal-to-noise ratio (SNR) before and after applying the advanced touch sensing system to the touch display device according to embodiments of the present disclosure.

Referring to FIG. 22, according to the touch sensing result when the advanced touch sensing system is not applied, that is according to the touch sensing result in the normal touch sensing system, SNR (SNR in the normal touch sensing system) lower than the allowable value (e.g., 35 dB) was measured at all five points (#1~#5). Here, the allowable value may mean a minimum SNR enabling normal touch sensing.

Referring to FIG. 22, according to the touch sensing result when the advanced touch sensing system is applied, that is according to the touch sensing result in the advanced touch sensing system, SNR (SNR in the advanced touch sensing system) higher than the allowable value (e.g., 35 dB) was measured at all five points (#1~#5).

Accordingly, according to the advanced touch sensing system of the touch display device according to embodiments of the present disclosure, SNR may be increased, and thus touch sensitivity may be improved.

The touch display device according to the embodiments of the present disclosure described above may include a first driving touch electrode disposed in the first area A1 of the display panel 110 and to which a first touch driving signal having a first touch driving frequency f1 is applied, a second driving touch electrode disposed in a second area A2 different from the first area A1 of the display panel 110 and to which a second touch driving signal having a second touch driving frequency f2 different from the first touch driving frequency f1 is applied, a sensing touch electrode crossing the first driving touch electrode to which the first touch driving signal is applied and the second driving touch electrode to which the second touch driving signal is applied, and a touch driving circuit 210 configured to detect a signal from the sensing touch electrode, separate the detected signal into a first sensing signal and a second sensing signal through filtering processing (and mixing processing) on the detected signal, and output the first sensing signal and the second sensing signal.

The touch display device may further include a third driving touch electrode disposed in the first area A1 and to which a third touch driving signal is applied, and a fourth driving touch electrode disposed in the second area A2 and to which a fourth touch driving signal is applied.

The third touch driving signal may have the same frequency as the first touch driving frequency of the first touch driving signal, and the fourth touch driving signal may have the same frequency as the second touch driving frequency of the second touch driving signal. The first touch driving signal and the third touch driving signal may correspond to the first touch driving signal TDS1 supplied to the first area A1. The second touch driving signal and the fourth touch driving signal may correspond to the second touch driving signal TDS2 supplied to the second area A2.

Referring to FIG. 17, as an example of a driving method, during the first driving period T1, the first touch driving signal may be applied to the first driving touch electrode in the first area A1 and the second touch driving signal may be applied to the second driving touch electrode in the second area A2. During the second driving period T2 after the first driving period T1, the third touch driving signal may be applied to the third driving touch electrode of the first area A1 and the fourth touch driving signal may be applied to the fourth driving touch electrode of the second area A2.

In this case, the first touch driving signal and the third touch driving signal may have the same phase, and the second touch driving signal and the fourth touch driving signal may have the same phase. In other words, the first touch driving signal and the third touch driving signal may be in phase, and the second touch driving signal and the fourth touch driving signal may be in the same phase.

Referring to FIG. 18, as another example of a driving method, during the first driving period T1, the first touch driving signal and the third touch driving signal are simultaneously applied to each of the first driving touch electrode and the third driving touch electrode in the first area A1, and the second touch driving signal and the fourth touch driving signal may be simultaneously applied to each of the second driving touch electrode and the fourth driving touch electrode in the second area A2.

In this case, the first touch driving signal and the third touch driving signal may have different phases, and the second touch driving signal and the fourth touch driving signal may have different phases. In other words, the first touch driving signal and the third touch driving signal may be out of phase, and the second touch driving signal and the fourth touch driving signal may be out of phase.

Each of the first touch driving frequency f1 and the second touch driving frequency f2 may be different from the display driving frequency f_disp related to the display driving of the display panel.

According to the embodiments of the present disclosure described above, it is possible to provide a touch display device and a touch driving circuit 210 that are robust against noise and have a high SNR.

According to embodiments of the present disclosure, it is possible to provide a touch display device and a touch driving circuit 210 that are robust to noise and have a high SNR even in a self-luminous display structure (e.g., organic light emitting display structure, etc.).

According to embodiments of the present disclosure, it is possible to provide a touch display device and a touch driving circuit 210 that are robust against noise and have a high SNR even on a large-area panel.

According to embodiments of the present disclosure, it is possible to provide a touch sensor structure in which the influence of display driving on touch sensing can be reduced, and it is possible to provide a touch driving circuit 210 and a touch display device suitable for the touch sensor structure.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
   a display panel including a plurality of data lines, a plurality of gate lines, and a touch sensor, wherein the touch sensor includes a plurality of first touch electrode lines and a plurality of second touch electrode lines;
   a data driving circuit configured to drive the plurality of data lines;
   a gate driving circuit configured to drive the plurality of gate lines; and
   a touch driving circuit configured to drive at least one of the plurality of first touch electrode lines with a first touch driving signal having a first touch driving frequency, and drive at least one of the plurality of second touch electrode lines with a second touch driving signal having a second touch driving frequency that is different from the first touch driving frequency,
   wherein the data driving circuit is configured to output data voltages to the plurality of data lines according to driving timings controlled by a display driving control signal,
   wherein the gate driving circuit is configured to output gate signals to the plurality of gate lines according to driving timings controlled by the display driving control signal, and
   wherein each of the first touch driving frequency and the second touch driving frequency is different from a display driving frequency of the display driving control signal related to display driving to display an image on the touch display device.

2. The touch display device according to claim 1, wherein the plurality of first touch electrode lines are disposed in a first area of the touch display device and the plurality of second touch electrode lines are disposed in a second area of the touch display device that is different from the first area.

3. The touch display device according to claim 1,
   wherein while the image is displayed, the touch driving circuit is configured to output at least one of the first touch driving signal and the second touch driving signal.

4. The touch display device according to claim 1, wherein the display driving control signal includes at least one of a horizontal synchronization signal or a gate clock signal, and
   wherein each of the first touch driving frequency and the second touch driving frequency is different from a frequency of the horizontal synchronization signal or a frequency of the gate clock signal.

5. The touch display device according to claim 2, wherein the touch sensor further includes a plurality of third touch electrode lines disposed over the first area and the second area,
   wherein each of the plurality of third touch electrode lines crosses the plurality of first touch electrode lines in the first area and crosses the plurality of second touch electrode lines in the second area,
   wherein the touch driving circuit includes a receiving circuit configured to sense the plurality of third touch electrode lines, wherein the receiving circuit includes a plurality of analog front ends connected to the plurality of third touch electrode lines, each of the plurality of analog front ends comprising:
   a first mixer configured to output a first mixed output signal by mixing a signal detected through a third touch electrode line of the plurality of third touch electrode lines and a first mixed signal, the first mixed signal having a same frequency as the first touch driving frequency of the first touch driving signal;
   a second mixer configured to output a second mixed output signal by mixing the signal detected through the third touch electrode line of the plurality of third touch electrode lines and a second mixed signal, the second mixed signal having a same frequency as the second touch driving frequency of the second touch driving signal;
   a first filter configured to apply a first filtering process on the first mixed output signal and output a first sensing signal having the first touch driving frequency based on the first filtering process; and
   a second filter configured to apply a second filtering process on the second mixed output signal and output a second sensing signal having the second touch driving frequency based on the second filtering process.

6. The touch display device according to claim 5, wherein responsive to the second touch driving frequency being greater than the first touch driving frequency, the first filter includes a low-pass filter that outputs a signal having a frequency less than or equal to a first cut-off frequency in the first mixed output signal as the first sensing signal, or the first filter includes a band-pass filter that outputs a signal having a frequency between a first low cut-off frequency and a first high cutoff frequency in the first mixed output signal as the first sensing signal, wherein the first cut-off frequency is greater than the first touch driving frequency and less than the second touch driving frequency, the first high cut-off frequency is greater than the first touch driving frequency and less than the second touch driving frequency, and the first low cut-off frequency is less than the first touch driving frequency, wherein the second filter is a high-pass filter that outputs a signal having a frequency equal to or greater than a second cut-off frequency in the second mixed output signal as the second sensing signal, or the second filter is a band-pass filter that outputs a signal having a frequency between a second low cut-off frequency and a second high cut-off frequency in the second mixed output signal as the second sensing signal, and wherein the second cut-off frequency is greater than the first touch driving frequency and less than the second touch driving frequency, the second high cut-off frequency is greater than the second touch driving frequency, and the second low cut-off frequency is greater than the first touch driving frequency and less than the second touch driving frequency.

7. The touch display device according to claim 1, further comprising a display panel including the touch sensor, wherein the display panel further includes:
a light emitting device including a cathode electrode;
an encapsulation layer on the light emitting device, and
wherein the plurality of first touch electrode lines and the plurality of second touch electrode lines are disposed on the encapsulation layer.

8. The touch display device according to claim 7, wherein the display driving frequency is a frequency of voltage fluctuations in an electrode or signal line related to display driving, the electrode or the signal line overlapping the cathode electrode of the light emitting device.

9. The touch display device according to claim 7, wherein the display panel further comprises:
a touch pad unit that is electrically connected to the touch driving circuit;
at least one dam located at an end of a slope of the encapsulation layer;
a plurality of first touch routing wires connected to the plurality of first touch electrode lines and the touch pad unit, the plurality of first touch routing wires extending along the slope of the encapsulation layer and overlapping an upper portion of the at least one dam; and
a plurality of second touch routing wires connected to the plurality of second touch electrode lines and the touch pad unit, the plurality of second touch routing wires extending along the slope of the encapsulation layer and passing over the upper portion of the at least one dam.

10. The touch display device according to claim 1, wherein the touch driving circuit is configured to sequentially drive the plurality of first touch electrode lines using the first touch driving signal, and configured to sequentially drive the plurality of second touch electrode lines using the second touch driving signal, and wherein the first touch driving signal supplied to each of the plurality of first touch electrode lines has a same phase, and the second touch driving signal supplied to each of the plurality of second touch electrode lines has a same phase.

11. The touch display device according to claim 1, wherein the touch driving circuit is configured to simultaneously and repeatedly supply a set of first touch driving signals to a set of first touch electrode lines among the plurality of first touch electrode lines in each of a plurality of first area driving periods, wherein at least one first touch driving signal among the set of first touch driving signals has a different phase from other first touch driving signals included in the set of first touch driving signals, wherein the touch driving circuit is configured to simultaneously and repeatedly supply a set of second touch driving signals to a set of second touch electrode lines among the plurality of second touch electrode lines in each of a plurality of second area driving periods, wherein at least one second touch driving signal among the set of second touch driving signals has a different phase from other second touch driving signals included in the set of second touch driving signals.

12. A touch display device comprising:
a first driving touch electrode included in a display panel of the touch display device, the first touch electrode applied with a first driving signal having a first frequency during a first driving period;
a second driving touch electrode included in the display panel, the second driving touch electrode applied with a second driving signal having a second frequency that is different from the first frequency during the first driving period;
a sensing touch electrode crossing the first driving touch electrode and the second driving touch electrode; and
a touch driving circuit configured to detect a signal from the sensing touch electrode during the first driving period,
wherein the touch driving circuit is configured to separate the detected signal into a first sensing signal having the first frequency and a second sensing signal having the second frequency, and output the first sensing signal and the second sensing signal.

13. The touch display device according to claim 12, wherein the first driving touch electrode is included in a first area of the display panel and the second driving touch electrode is included in a second area of the display panel that is different from the first area.

14. The touch display device according to claim 13, further comprising:
a third driving touch electrode disposed in the first area and applied a third driving signal having a same frequency as the first frequency of the first driving signal; and
a fourth driving touch electrode disposed in the second area and applied a fourth driving signal having a same frequency as the second frequency of the second driving signal.

15. The touch display device according to claim 14, wherein during the first driving period, the first driving signal is applied to the first driving touch electrode in the first area, and the second driving signal is applied to the second driving touch electrode in the second area, and during a second driving period after the first driving period, the third driving signal is applied to the third driving touch electrode in the first area, and the fourth driving signal is applied to the fourth driving touch electrode in the second area.

16. The touch display device according to claim 15, wherein the first driving signal and the third driving signal are in phase with each other, and the second driving signal and the fourth driving signal are in phase with each other.

17. The touch display device according to claim 14, wherein during the first driving period, the first driving signal and the third driving signal are simultaneously applied to each of the first driving touch electrode and the third driving touch electrode in the first area, and during the first driving period, the second driving signal and the fourth driving signal are simultaneously applied to each of the second driving touch electrode and the fourth driving touch electrode in the second area.

18. The touch display device according to claim 17, wherein the first driving signal and the third driving signal have different phases, and the second driving signal and the fourth driving signal have different phases.

19. The touch display device according to claim 12, wherein each of the first frequency and the second frequency is different from a display driving frequency related to display driving for the display panel to display an image.

20. A touch display device comprising:
  a display panel including a first touch electrode line, a second touch electrode line, a signal line to which a display signal is applied to display an image on the display panel, and a light emitting device comprising a first electrode and a second electrode, the first electrode is applied the display signal and the second electrode is overlapped by the signal line; and
  a touch driving circuit configured to drive the first touch electrode line with a first touch driving signal having a first touch driving frequency, and drive the second touch electrode line with a second touch driving signal having a second touch driving frequency that is different from the first touch driving frequency,
wherein the first touch electrode line is included in a first area of the display panel and the second touch electrode line is included in a second area of the display panel that is different from the first area,
the touch display device further comprising:
  a third touch electrode line disposed in the first area and applied a third driving signal having a same frequency as the first touch driving frequency of the first driving signal; and
  a fourth touch electrode line disposed in the second area and applied a fourth driving signal having a same frequency as the second touch driving frequency of the second driving signal.

* * * * *